(12) United States Patent
Schultz et al.

(10) Patent No.: US 10,128,911 B2
(45) Date of Patent: *Nov. 13, 2018

(54) ARRANGEMENT FOR MANAGING WIRELESS COMMUNICATION BETWEEN DEVICES

(71) Applicant: XPED HOLDINGS PTY LTD, Mawson Lakes (AU)

(72) Inventors: John Schultz, Forreston (AU); Christopher Wood, Beaumont (AU); Philip Carrig, Tranmere (AU)

(73) Assignee: XPED HOLDINGS PTY LTD, Mawson Lakes South Australia (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/480,492

(22) Filed: Apr. 6, 2017

(65) Prior Publication Data
US 2017/0279497 A1 Sep. 28, 2017

Related U.S. Application Data

(63) Continuation of application No. 14/853,745, filed on Sep. 14, 2015, now Pat. No. 9,647,726, which is a (Continued)

(30) Foreign Application Priority Data

Mar. 26, 2009 (AU) ................................ 2009901298

(51) Int. Cl.
*G06F 15/18* (2006.01)
*G06N 3/00* (2006.01)
(Continued)

(52) U.S. Cl.
CPC ......... *H04B 5/0043* (2013.01); *H04L 12/281* (2013.01); *H04M 1/72533* (2013.01);
(Continued)

(58) Field of Classification Search
CPC ............. H04M 1/7253; H04M 1/6091; H04M 1/72527; H04M 2207/20; H04W 84/18;
(Continued)

(56) References Cited

U.S. PATENT DOCUMENTS 6,133,847 A 10/2000 Yang
6,791,467 B1 9/2004 Ben-Ze'ev
(Continued)

FOREIGN PATENT DOCUMENTS

FR 2 912 863 A1 8/2008
JP 2002-149512 A 5/2002
(Continued)

OTHER PUBLICATIONS

Supplementary European Search Report for corresponding European Application No. 10755331.5 dated Apr. 22, 2016.

*Primary Examiner* — Shaima Q Aminzay
(74) *Attorney, Agent, or Firm* — Birch, Stewart, Kolasch & Birch, LLP

(57) ABSTRACT

An arrangement for managing bi-directional wireless communication between a controller and a plurality of controllable-devices wherein each controllable-device is able to provide operable function specific instructions to the controller as to how it would like to be operated by the controller and wherein a proximity mechanism means provides bidirectional communications over a distance of a few centimeters between the controller and the or each controllable-device.

1 Claim, 29 Drawing Sheets

Related U.S. Application Data continuation of application No. 13/260,084, filed as application No. PCT/AU2010/000358 on Mar. 26, 2010, now Pat. No. 9,136,913.

(51) Int. Cl.

| | | |
|---|---|---|
| *H04B 5/00* | (2006.01) | |
| *H04W 8/00* | (2009.01) | |
| *H04W 8/24* | (2009.01) | |
| *H04L 12/28* | (2006.01) | |
| *H04M 1/725* | (2006.01) | |

(52) U.S. Cl.
CPC .............. *H04W 8/005* (2013.01); *H04W 8/24* (2013.01); *G08C 2201/20* (2013.01); *G08C 2201/91* (2013.01); *H04M 2250/04* (2013.01); *H04M 2250/12* (2013.01)

(58) Field of Classification Search
CPC ....... H04W 88/06; H04W 4/02; H04W 8/005; H04W 8/24; H04B 5/0043; G08C 2201/20; G08C 2201/91
USPC .......... 455/41.1, 41.2, 41.3, 3.03, 3.05, 3.06
See application file for complete search history.

(56) References Cited

U.S. PATENT DOCUMENTS

| | | | |
|---|---|---|---|
| 7,224,903 B2 | 5/2007 | Colmenarez et al. | |
| 7,437,151 B2 | 10/2008 | Kim et al. | |
| 7,957,528 B2 | 6/2011 | Iwamura | |
| 8,175,233 B2* | 5/2012 | Vaghar .............. | H04M 3/53333 |
| | | | 379/88.17 |
| 9,136,913 B2* | 9/2015 | Schultz ................ | H04B 5/0043 |
| 9,647,726 B2* | 5/2017 | Schultz ................ | H04B 5/0043 |
| 2004/0203590 A1 | 10/2004 | Shteyn | |
| 2006/0227032 A1 | 10/2006 | Vidal | |
| 2007/0188323 A1 | 8/2007 | Sinclair et al. | |
| 2007/0260331 A1 | 11/2007 | Rouhier et al. | |

FOREIGN PATENT DOCUMENTS

| | | |
|---|---|---|
| WO | WO 01/71685 A1 | 9/2001 |
| WO | WO 03/056531 A1 | 7/2003 |
| WO | WO 2005/036325 A2 | 4/2005 |
| WO | WO 2008/007175 A1 | 1/2008 |

\* cited by examiner

```xml
<?xml version="1.0" ?>
<!DOCTYPE rap SYSTEM "rdf.dtd">
<!-- Example RDF for ADRC compliant TV -->

<rdf>
    <device>
        <description>                                          ──── 1000
            <manf>Virtucon</manf>
            <model>ATV1000</model>
            <class>TV</class>
            <version>1.2</version>
        </description>

<controllable>                                         ──── 1010
            <function id='power'>
                <label>Power</label>
                <cmd>807F</cmd>
                <voice>power on</voice>                        ──── 1011
            </function>
            < function id='volume'>                            ──── 1012
                <label>Volume</label>
                <cmd>58A7 $value$</cmd>
                <value>
                    <range>
                        <min>0</min>
                        <max>100</max>
                        <step>2</step>
                    </range>
                </value>
                <voice>volume $range</voice>
            </ function >
            < function id='inputs'>
                <label>Inputs</label>
                <cmd>FE7D $value$</cmd>
                <value>
                    <list>
                        <item>
                            <label>HDMI1</label>
                            <tag>hdmi1</tag>
                        </item>
                        <item>
                            <label>AV1</label>
                            <tag>av1</tag>
                        </item>
                    </list>
                </value>
            </ function >

<group id='numeric-keys'>                          ──── 1013
                <!-- controls for 0..9, *, # -->
            </group>

<voice>
                <attention>teevee</attention>
                <response>television command</response>
            </voice>
        </controllable>
```

*Figure 21a*

```
<automation>                                                    1020
    <resource type='text/javascript'>
        <implements>xert</implements>                           1021
        <script>
        function trigger(url)                                   1022
        {
            var p=window.getFrame("upper");
            p.location = url;
            p.visible(true);
        }
        </script>
    </resource>

<resource type='application/octet -stream'>                 1023
        <implements>epg</implements>
        <options>autoload, autostop</options>
        <platform name='SR1 '>
            <link ver='1.0' h ref='ftp://virtucon.com/apps/sr1 -epg-1.0'/>
        </platform>
    </resource>

<interface id='xert'>                                       1024
        <event id='trigger'>
            <document>
                <member>
                    <name>address</name> <type>url</type>
                </member>
            </document>
        </event>
    </interface>
    <interface id='epg'>                                        1025
        <document id='guide'>                                   1026
            <array><struct>
                <member>
                    <name>program-name</name> <type>string</type>
                </member>
                <member>
                    <name>start-date</name> <type>dateTime.iso8601</type>
                </member>
            </struct></array>
        </document>

<event id='changed' document='guide' />                 1027

<method id='subscribe' >                                1028
            <call>
                <param><name>event</name><type>string</type></param>
            </call>
        </method>

<method id='get-guide'>                                 1029
            <return document='guide' />
        </method>
    </interface>
</automation>
```

*Figure 21b*

```xml
<configuration>                                              ── 1030
    <input id='hdmi'>
        <label>HDMI1</label>
        <hdmi>
            <connector>
                <type>hdmi-a-receptacle</type>
                <mating>hdmi-a-plug</mating>
            </connector>
            <protocol>ddc, tmds, cec</protocol>
            <version>1.2</version>
        </hdmi>
    </input>

<input id='av'>                                          ── 1031
        <label>AV1</label>
        <group id='av-composite'>
            <audio>
                <connector>
                    <type>rca-receptacle</type>
                    <mating>rca-plug</mating>
                    <label>Left</label>
                    <color>white</color>
                </connector>
            </audio>
            <audio>
                <connector>
                    <type>rca-receptacle</type>
                    <mating>rca-plug</mating>
                    <label>Right</label>
                    <color>red</color>
                </connector>
            </audio>
            <video>
                <connector>
                    <type>rca-receptacle</type>
                    <mating>rca-plug</mating>
                    <label>Video</label>
                    <color>yellow</color>
                </connector>
            </video>
        </group>
        <group id='svideo'>                                  ── 1032
            <svideo>
                <connector>
                    <type>mini-din-4-receptacle</type>
                    <type>mini-din-4-plug</type>
                    <label>S-video</label>
                </connector>
            </svideo>
        </group>
    </input>

<output id='out'>                                        ── 1033
        <group id='out-composite' >
            <!--Same as av-composite group -->
        </group>
    </output>
</configuration>
    </device>
</rdf>
```

*Figure 21c*

ARRANGEMENT FOR MANAGING WIRELESS COMMUNICATION BETWEEN DEVICES

CROSS-REFERENCE TO RELATED APPLICATIONS

This application is a Continuation of application Ser. No. 14/853,745 filed Sep. 14, 2015, which is a Continuation of application Ser. No. 13/260,084 filed on Sep. 23, 2011 (Now U.S. Pat. No. 9,136,913 Issued on Sep. 15, 2015), which is a National Phase of PCT International Application No. PCT/AU2010/000358 filed on Mar. 26, 2010, which claims priority under 35 U.S.C. § 119(a) to Patent Application No. 2009901298 filed in Australia on Mar. 26, 2009. All of the above applications are hereby expressly incorporated by reference into the present application.

FIELD OF THE INVENTION

The present invention relates to the field of remote controls, and remotely operated devices and more particularly to managing the interaction between a controller and one or more controllable-devices.

BACKGROUND OF THE INVENTION

Many modern pieces of household equipment come with a remote control. This allows a user to control them from a convenient location. However, as the user purchases additional appliances, this can result in them acquiring many remote controls, each directed to a specific piece of equipment. For instance, there may be a separate remote control for a television, a DVD player, a stereo, a pay television box and other appliances.

Furthermore, many modern remote controls provide a large number of functions. Although this provides greater control to the user, it sometimes causes the remote control to become both complicated and confusing.

The compounded effect of having a large number of remote controls, each with a large number of functions, substantially diminishes the convenience provided by the remote controls themselves. One existing solution is a "universal" remote control—a single remote control which can control multiple devices. A single universal remote can be used to replace a number of other remote controls.

The current state of the art can be broadly grouped into three generations of remote control technology, which are depicted in FIGS. 2a through 2c. First generation remote controls contain the full control codes for one appliance and occasionally partial control codes for a second. For example a TV remote control may also have a few commonly used functions for a DVD player. The control codes are fixed and installed by the manufacturer in the factory. The communications medium is usually infrared (there are some RF systems) and provides a one way only channel from the controller to the appliance. Second generation remote controls can contain the control codes for many appliances. The control codes are either installed by the manufacturer at the factory or can be programmed later by the user.

Programming is accomplished by the user downloading appropriate control codes from a server on the Internet to a computer and then software on the computer installing the codes to the remote control. The communications medium is usually infrared and provides a one way only channel from the controller to the appliance.

Furthermore the programming situation for the user is further complicated for those programmable universal remotes that are able to control several devices in pre-programmed 'macro' sequences. For example a sequence named "Play DVD" could be created that turns on the DVD player and the TV, changes the TV to the correct AV input for the DVD and starts the DVD playing.

Third generation remote controls are very similar to the second generation but include a learning capability where they are able to 'learn' the control codes emitted from other remote controls. The communications medium is usually infrared and provides a one way only channel from the controller to the appliance.

A new remote control technology known as RF4CE is emerging. This technology improves the current state of the art in a number of ways. Firstly it replaces the infrared system with a radio frequency system that is able to penetrate through walls and carry over greater distances. Secondly, it implements a standard control profile known as CERC that includes control codes for many common audio visual appliances. An industry alliance of consumer equipment manufactures are planning to offer appliances that conform to this standard profile. This promises a basic level of interoperability between a remote control made by one manufacturer and appliances made by another.

However the solution provided by RF4CE is still far from perfect. RF4CE uses a fixed profile system where all parties that implement a profile must agree on what features and functions are to be provided by it. For a device to be certified it must implement a profile fully. This presents many problems for manufactures.

The problems begin when the manufacturers have to agree on what functions should be included in the standard profile and which should not. Any functions that are not included in the standard profile must be put in to a vendor specific profile. For those devices that only implement the standard profile there is little or no differentiation between one manufacturer's product and the next. For those that implement a vendor specific profile in addition to the standard profile, the remote control from another vendor will not be able to issue the vendor specific command set, which is a poor situation for the user.

For a standard profile to be useful it must have a reasonably comprehensive set of commands. This presents a problem for those manufactures that want to make a low cost product. In order to drive cost down they need to implement only a small number of features, however if they do this their product cannot be certified as it will not implement all the features in the standard profile.

Furthermore, when a remote that implements the standard profile is used, the low cost device will not implement all the standard features and hence not all function on the remote will work, which is annoying for the user. In effect these RF4CE remote controls are an improved second-generation technology.

Due to the limitations of the present remote control technology, the usage of remote controls is generally restricted to localized situations, i.e. the remote control remains in the same location as the appliances it controls. Users of present remote controls do not take them away from the location containing the appliances they can control because the remote control would not be in a position to control 'foreign' appliances unless it was reprogrammed.

Furthermore, some new devices such as popular media players have external accessories that they are able to couple with. For example the iPod can dock with many types of external accessories that are designed specifically for it such as powerful HiFi units, portable ghetto blasters, clock radio units and the like. However the problem for consumers and manufactures is that Apple tightly controls the docking interface that uses proprietary technology and is encumbered by a mechanical connector which does not facilitate remote operation.

Using such an arrangement is inflexible and requires a wired connection between controller and device or a plug-in dongle to provide wireless communication technology appropriate for remote control and moreover, the user is required to find then download software applications to make it all work.

Finally, devices that currently do not have remote controls (e.g. washing machines, dryers, ovens, lights, power points and the like) and new devices that do not exist now but will be created in the future, will benefit greatly from the ability to be controlled by and interact with a truly universal controller and for the control interface to automatically configure itself for the new appliance and to be easily extensible by the manufacturer and customizable by the user without modification to the software or hardware of the controller or the device.

It is then an object of the present invention to reduce or ameliorate one or more of the problems and disadvantages described above and to advance the state of the art with respect to the interchange and control of information or operation between a controller and one or more electronically controllable devices.

SUMMARY OF THE INVENTION

In an aspect of the invention and arrangement for managing wireless communication between a device and one or more other devices, the arrangement includes; a first device having a processor, memory, a communication mechanism and a proximity sensor and having access to a resource description file of at least the first device; and a second device having a processor, memory, a communication mechanism and a proximity sensor and having no access to a resource description file for the first device, wherein the first device and the second device are brought together, including physical contact, such as to confirm the proximity of the first device and the second device so that at least the first device and the second device can communicate wirelessly and thus make available to the memory of the second device at least the resource description file of the first device for processing by the processor of the second device.

BRIEF DESCRIPTION OF THE DRAWINGS

An illustrative embodiment of the present invention will be discussed with reference to the accompanying drawings wherein:

FIGS. 21a-21c are examples of the content inside a resource description file.

DETAILED DESCRIPTION OF THE INVENTION

The present invention to be discussed in detail below generally discloses a new and inventive remote control technology that is adapted so that a controller may control and interact with any kind of appliance or general device and that does not require the user to have to perform any setup or configuration in order for the system to operate other than a simple association between controller and self-describing device.

In the present invention:
a 'self-describing device' or simply 'device' refers equally to an item of hardware or a software application;
a mechanism refers to functionality that can be realized in either hardware or software or a combination of both;

a display mechanism refers to an item that can display visual information to a user such as an LCD, touch-screen, or projection system;

the first device is one having access to at least it's resource description file. This device can be realized in either hardware or software or a combination of both. Once example of the implementation of the first device is a controllable device;

the second device is one having no access to a resource description file for the first device. This device can be realized in either hardware or software or a combination of both. One example of the implementation of the second device is a controller device, or simply controller.

Figure 1:
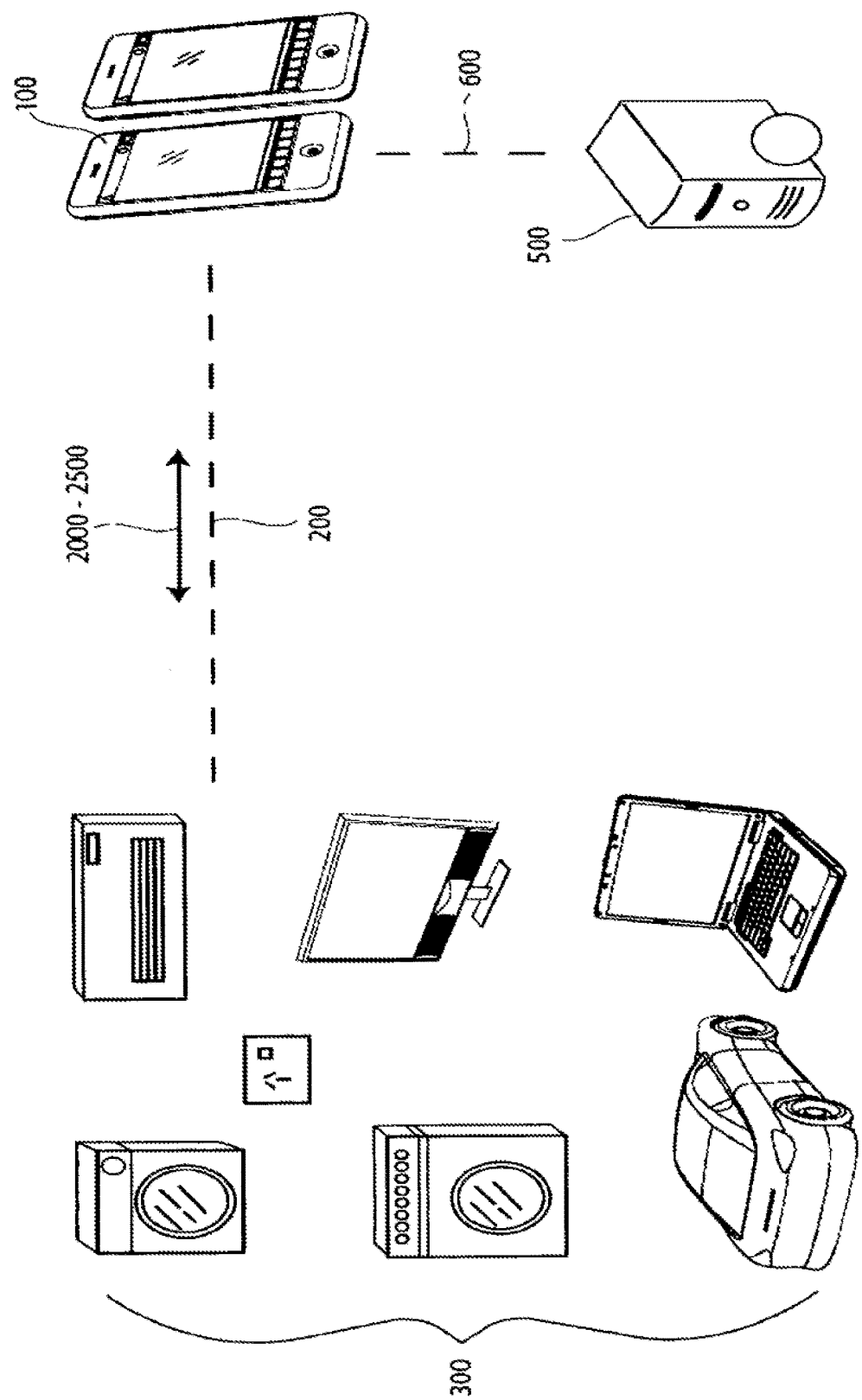
FIG. 1 is a conceptual diagram of the basic arrangement of the present invention.

FIG. 1 discloses a remote control system comprising one or more controllers 100 that communicate using a protocol means 2000, 2100, 2200, 2300, 2400, 2500 carried via wireless communications link 200, with one or more devices 300 which according to the teachings of the present invention are self-describing. Furthermore, controller 100 may also communicate with server 500 via communications network 600 in order to access any resources it or the user may require to interact with, or effect the customization of device 300.

Device 300 implements the Auto Discovery Remote Control (ADRC) Protocol and consequently contains at least one Resource Description File (RDF). Using the ADRC Protocol, controller 100 communicates with device 300 over wireless communications link 200.

Figure 20A:
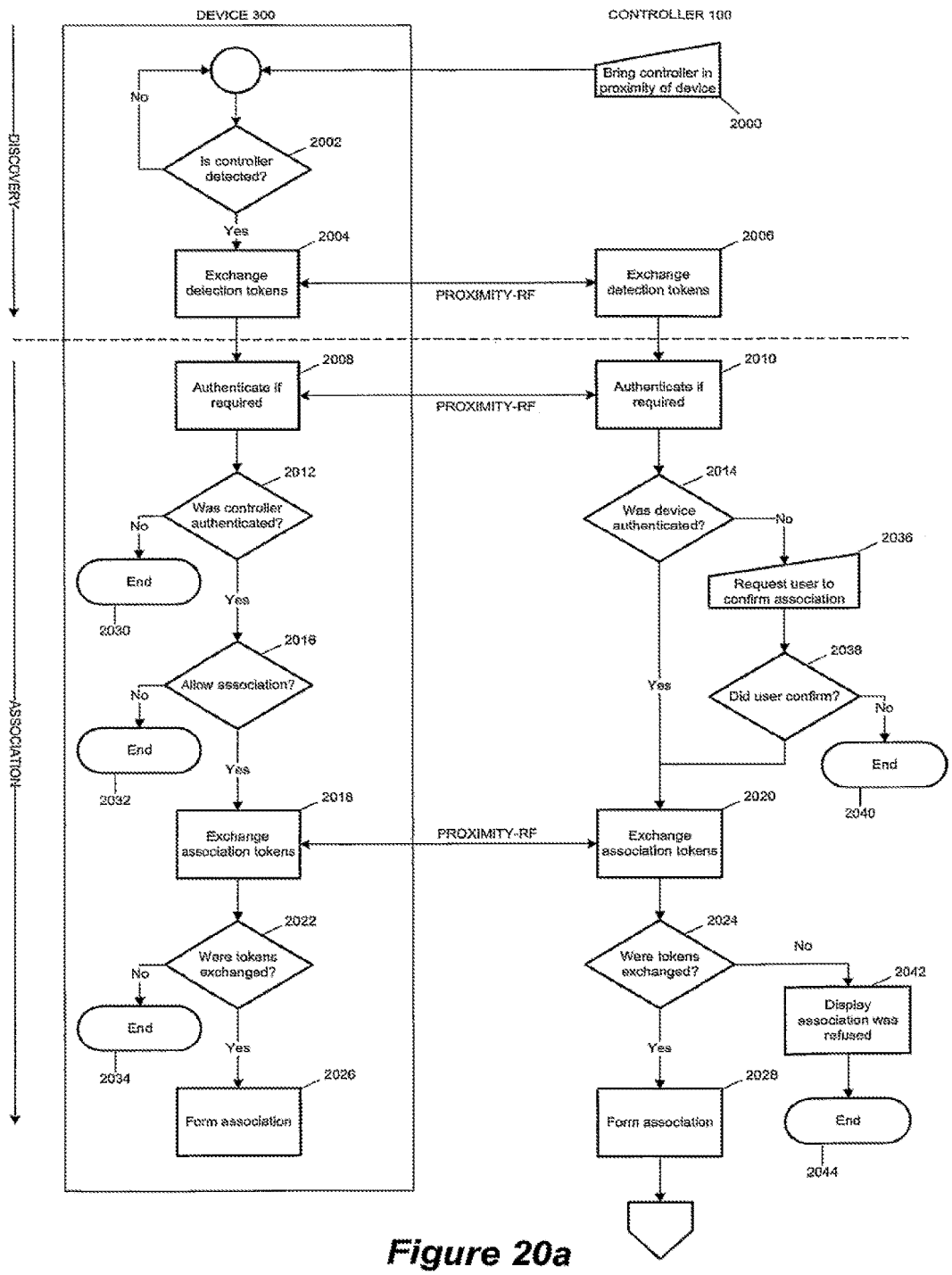
FIGS. 20a-20e are flow charts that describe the method defined by the ADRC Protocol.
Figure 20B:
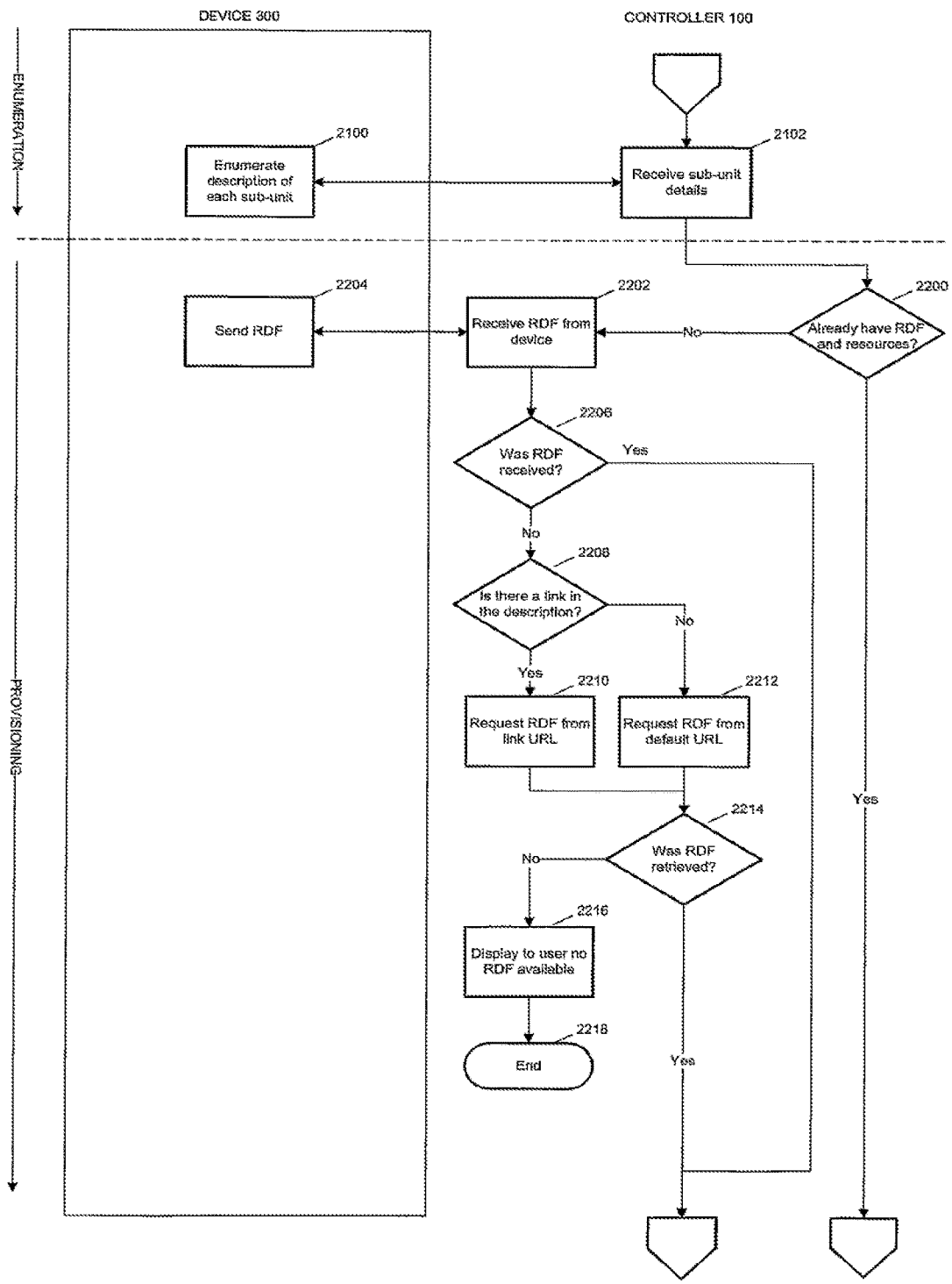
Figure 20C:
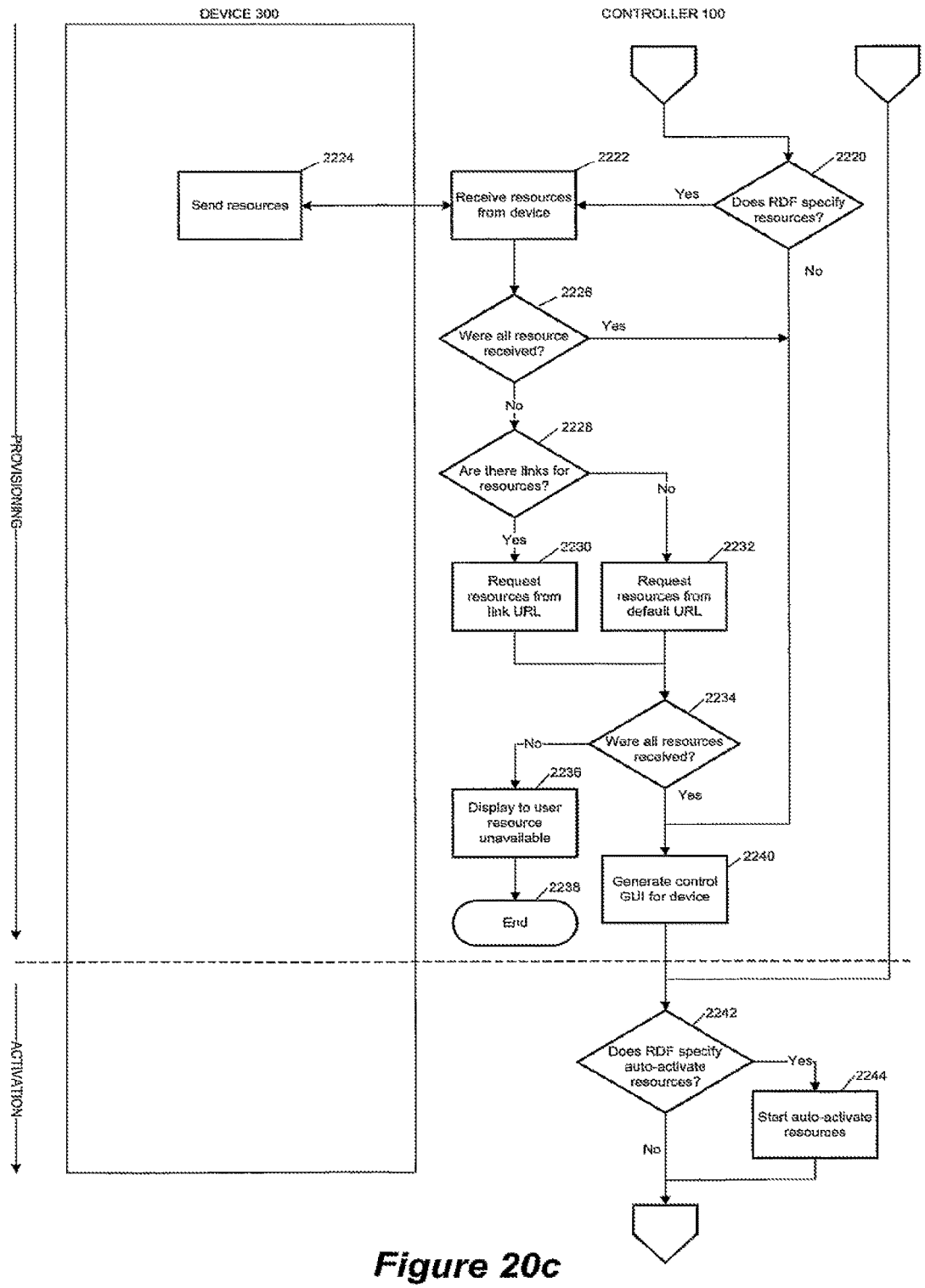
Figure 20D:
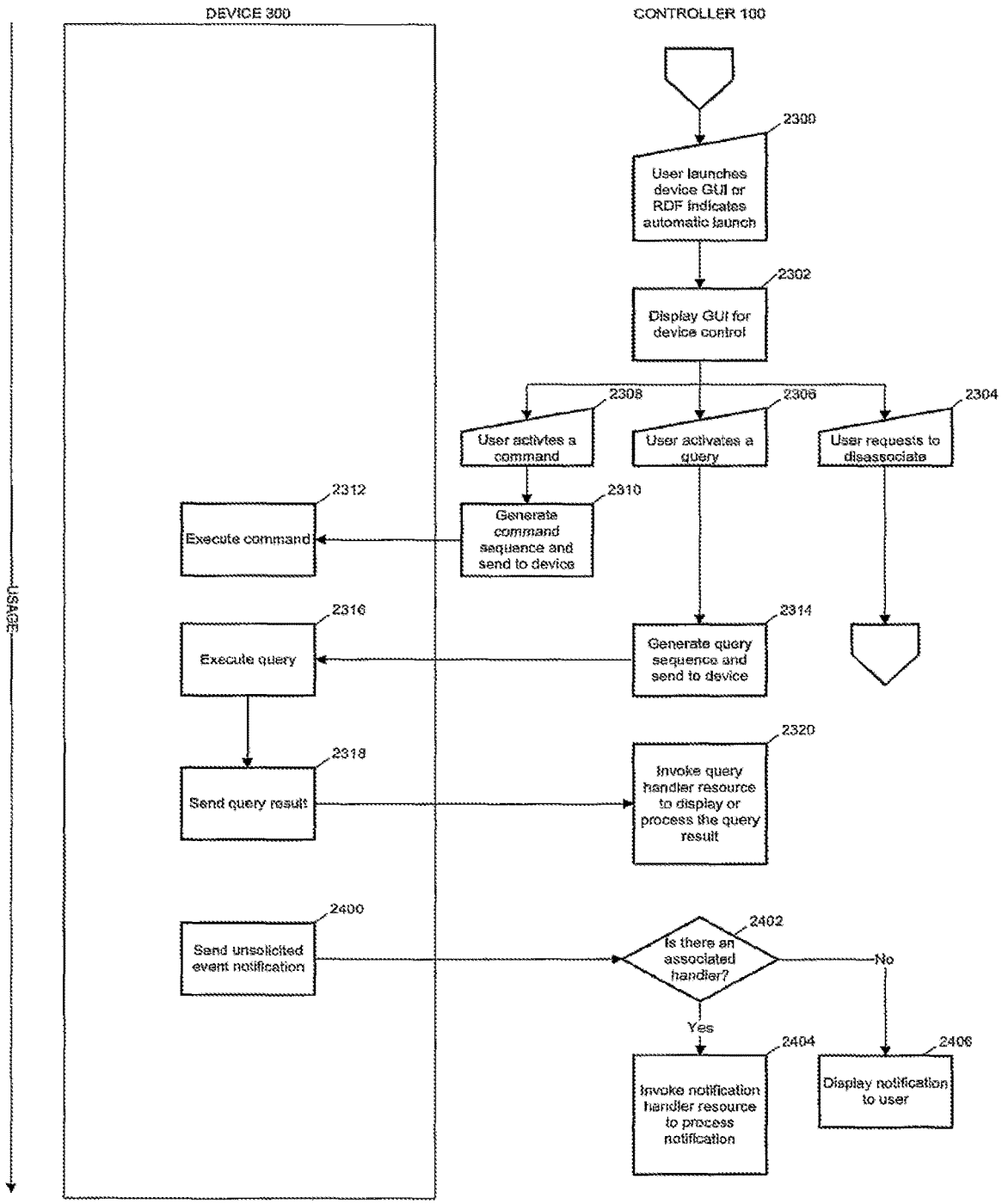
Figure 20E:
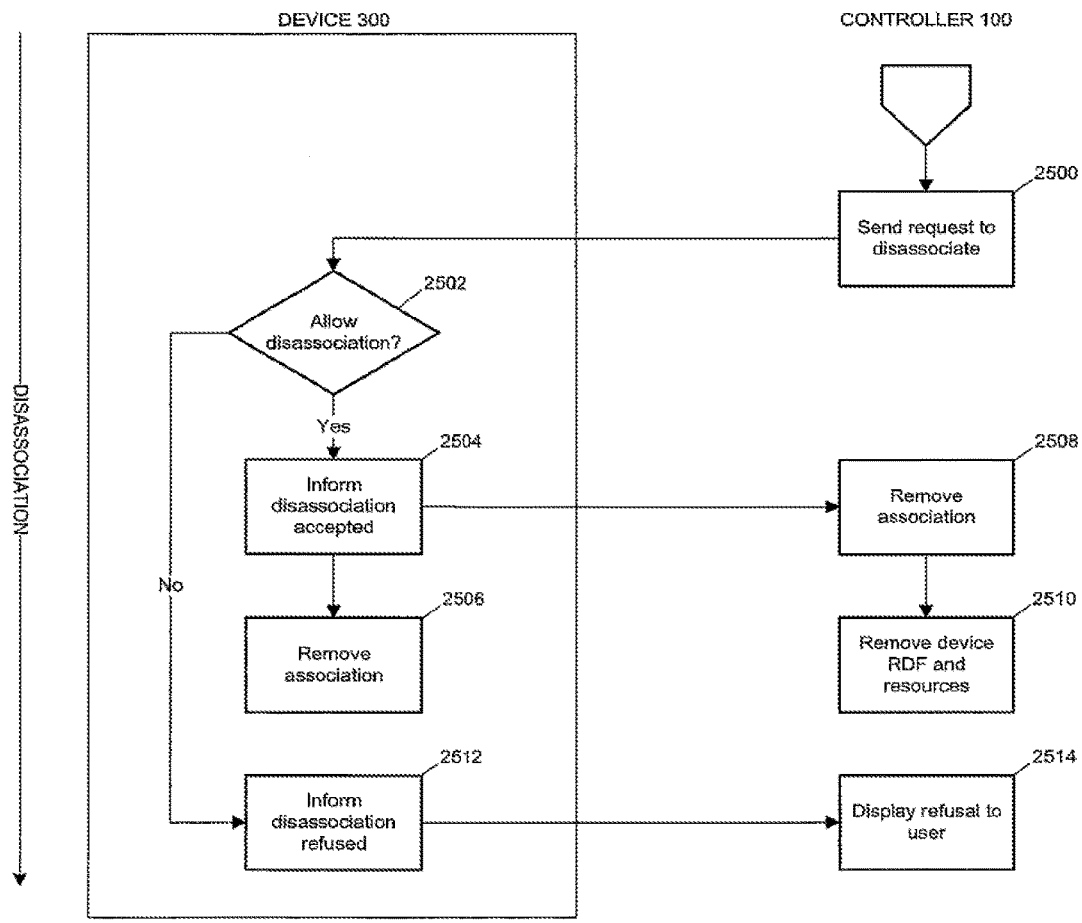

In protocol step 2000 (FIG. 20a) controller 100 and device 300 discover each other and subsequently form an association whereby they may freely engage in bidirectional communication.

In protocol step 2100 controller 100 receives an RDF for each sub-unit of device 300 and attempts to retrieve any resources indicated therein. Once these have been acquired, controller 100 uses information in the RDF to dynamically generate a user interface that is necessary and sufficient for controlling device 300 and to configure any handler resources required to respond to events that may be received.

In protocol step 2200 controller 100 receives the descriptive information for device 300. The descriptive information may contain items including manufacturer, model, version and link and this is provided for one or several sub-units that device 300 may implement.

In protocol step 2300 the user activates a control from the user interface which may be by issuing a voice instruction and controller 100 formulates the correct command code sequence using the associated information in the RDF and sends this to device 300, which receives the command code sequence and implements the associated command.

In protocol step 2400 device 300 sends an unsolicited event notification to controller 100 indicating that it has changed state or some other change in state has occurred. Controller 100 is able to interpret the notification using information contained in the RDF and action an appropriate response by invoking the associated handler resource.

In protocol step 2500 controller 100 and device 300 forget their association and can no longer communicate.

Figure 2A:
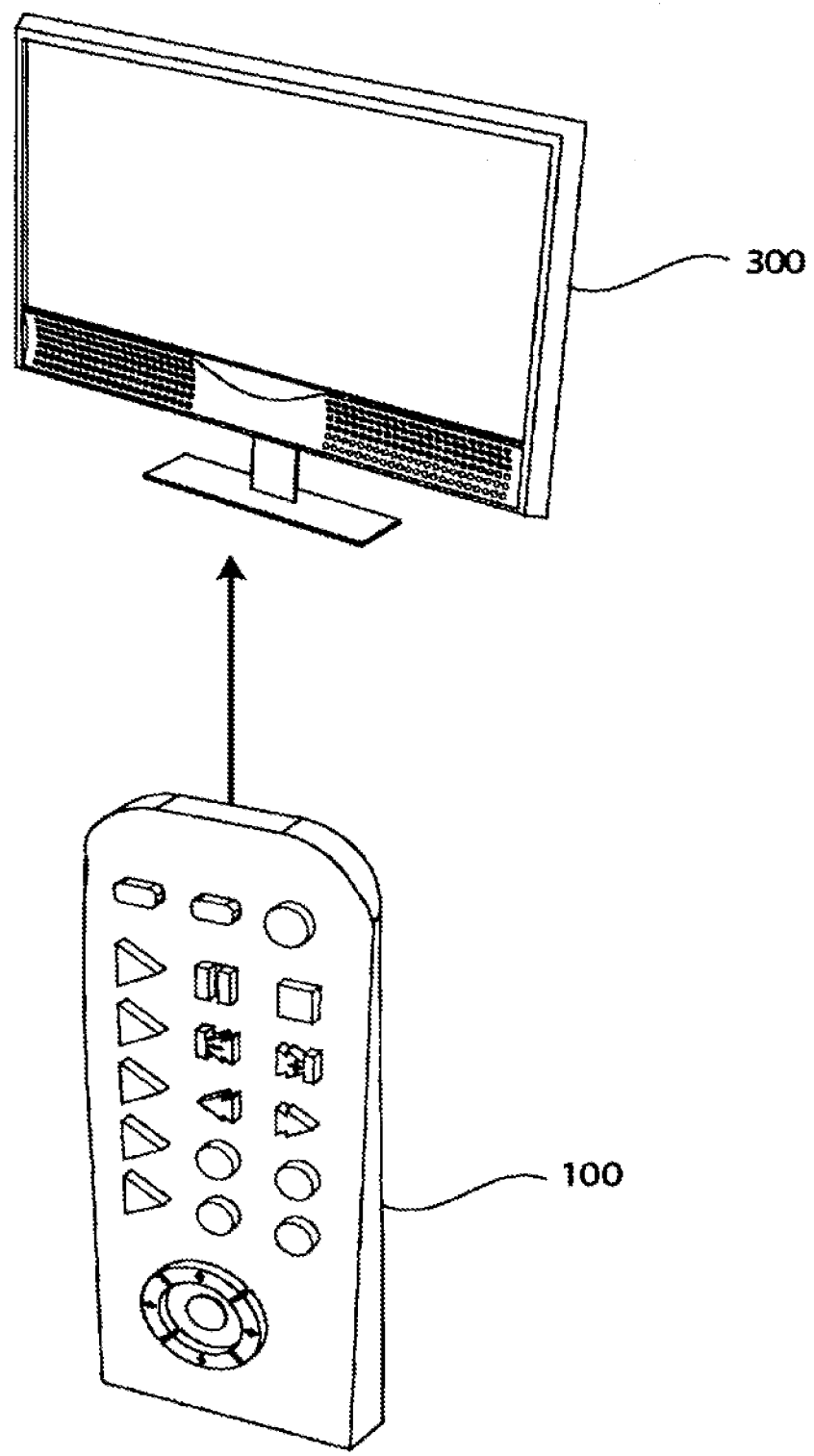
FIG. 2a is a conceptual diagram of a first-generation (basic) remote control for controlling a device.
Figure 2B:
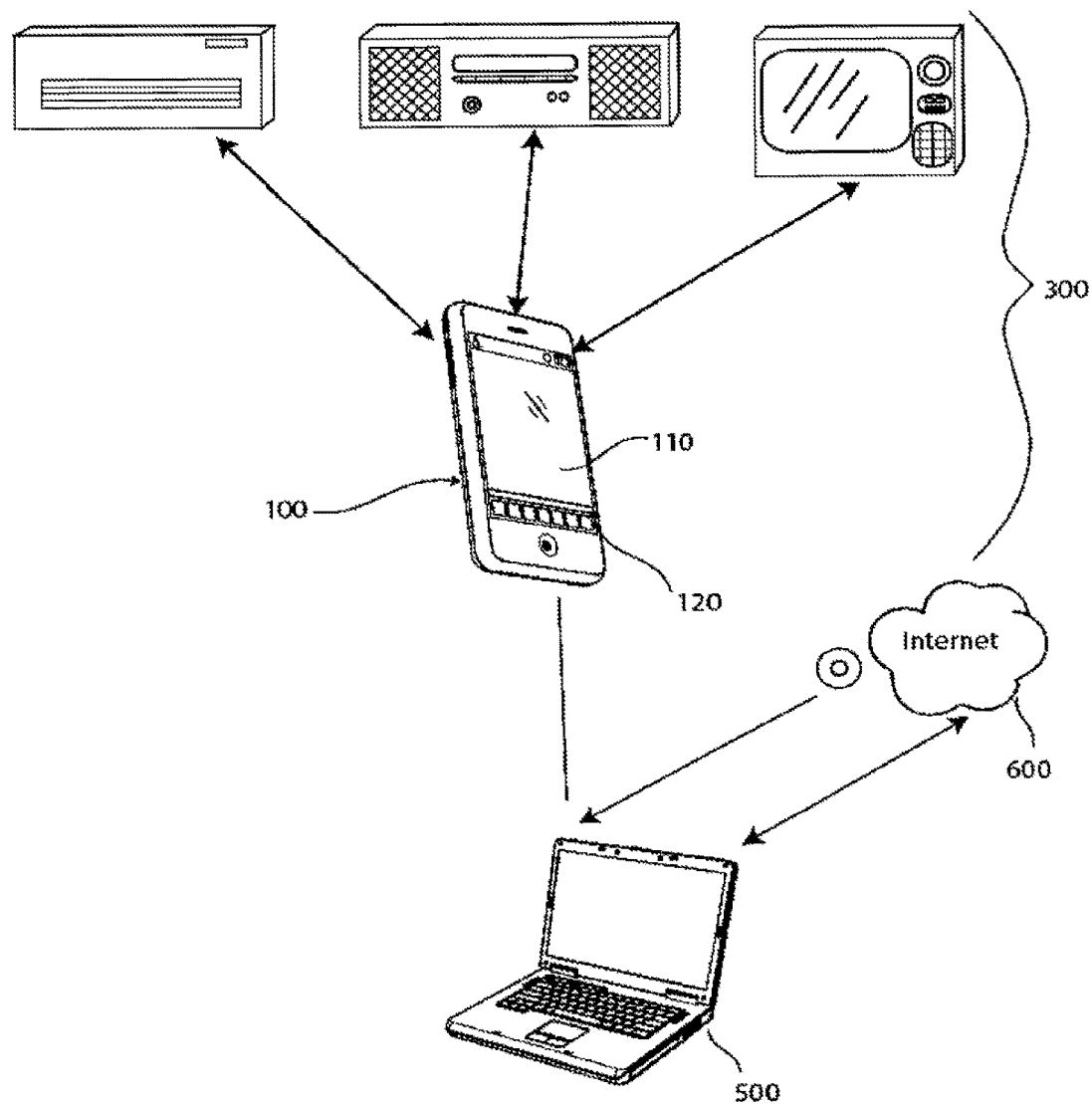
FIG. 2b is a conceptual diagram of a second-generation (universal) remote control for controlling multiple devices.
Figure 2C:
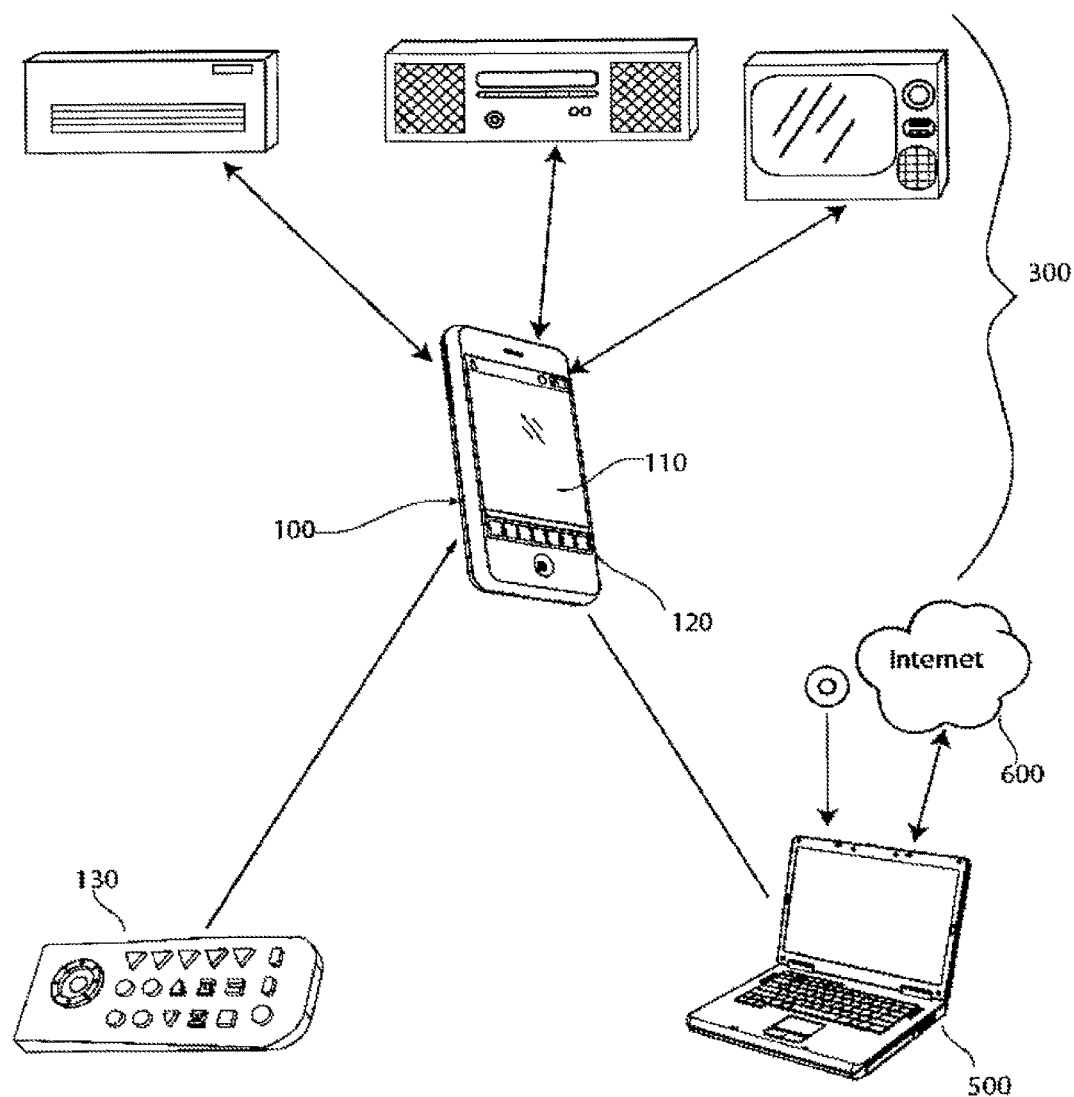
FIG. 2c is a conceptual diagram of a third-generation (learning) remote control for controlling multiple devices.

As introduced above the current state of the art can be broadly grouped into three generations of remote control technology, which are depicted in FIGS. 2a through 2c. These figures were described above also but for detailing the controllable devices are referenced generally as 300 and the controller 100.

The display on the controller is 110 and the user input means 120. The Internet in shown generally as 600 and a portable PC is numbered 500 and a remote control being learned by the controller is referenced as 130.

It should be understood that the ensuing description is based on an embodiment where the controller and device first discover each other by way of a Proximity Touch Gesture that activates when the devices are so close that they are practically touching. Proximity based discovery is considered the preferred embodiment for consumer appliances for the following reasons: it provides the most convenient and easy to operate method for users to form associations between controllers and devices, it is a suitable 'default' communication channel between all devices and controllers, it enables discovery to be independent of the PAN/LAN technology implemented on the device and controller, it is a secure mechanism for exchanging sensitive information such as encryption keys and the like and it adds very little cost to the build price.

Figure 3:
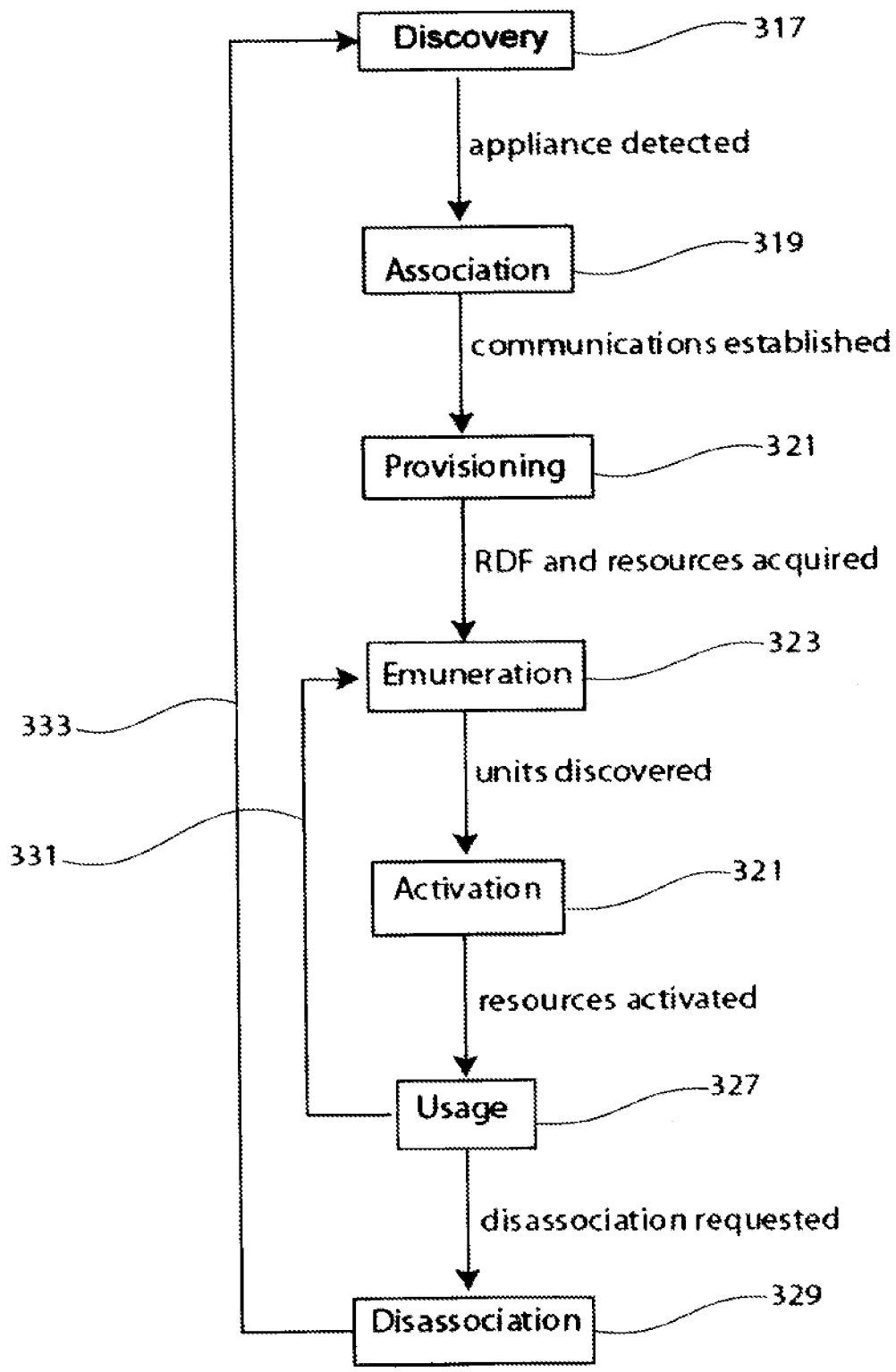
FIG. 3 depicts the life cycle of an association between a controller and a device that obey the ADRC Protocol.

FIG. 3 depicts the life cycle of the association between controller 100 and device 300 which consists of 7 phases 317, 319, 321, 323, 325, 327 and 329.

Discovery 317

In order to establish an association, device 300 must first discover controller 100.

Discovery may be achieved using several methods including:

discovery mechanisms provided by PAN protocols for example the discovery feature provided by the NLME of the RF4CE protocol, discovery services provided on a LAN for example Avahi, Proximity mechanisms for example Near Field Communications (NFC) or some other inductive coupling method that enables detection and communications at very close ranges typically less than 5 cm, optical methods such as reading a barcode, magnetic methods such as employed in a tape head, electrical methods such as OneWire and radio frequency methods such as RFID.

Using the Proximity Touch Gesture method, the device and controller are able to sense when they are practically touching. Once in proximity they are able exchange information over a short range communications link. Information is passed that enables them to determine whether they have the necessary communications facilities to establish a wireless connection with each other.

Discovery 317 may also be linked (333) to disassociation 329.

Association 319

Depending on the application, device 300 may require controller 100 to authenticate and vice versa. If authentication is required and completes successfully, device 300 and controller 100 exchange any information required to establish a network connection with each other. For example if the network was an RF4CE PAN, controller 100 would send a PAIR.request message to the NLME and device 300 would reply with a PAIR.response. If successful both parties will have 'paired' with each other and now able to communicate freely.

Provisioning 321

In order to interact with device 300, controller 100 may require certain information and other resources such as data or software applications and the like. These are specified in the RDF. Provisioning is the process whereby the RDF is acquired and any other resources specified therein are acquired and installed.

Enumeration 323

Enumeration is the mechanism whereby device 300 provides descriptive information for each of its sub-units to controller 100. This information includes the identity of the manufacturer, the model, the version, an optional link to where an RDF may be found and any further information as may be required by specific applications.

Enumeration 323 may also be linked (331) to usage 327.

Activation 325

Some of the resources acquired during the provisioning phase may be software applications and may need to be automatically started. This is done during the activation phase.

Usage 327

Once the previous phases are complete, controller 100 is able to provide the facilities required for the user to control device 300. Furthermore if device 300 is able to generate unsolicited event notifications then the facilities required by controller 100 to handle these are now in place.

Disassociation 329

At some point it may be necessary to break the association between device 300 and controller 100 for example if the device is an item of AV equipment and the owner decides to sell it to another party. During the disassociation phase the previously formed association between device and controller is forgotten.

Figure 4:
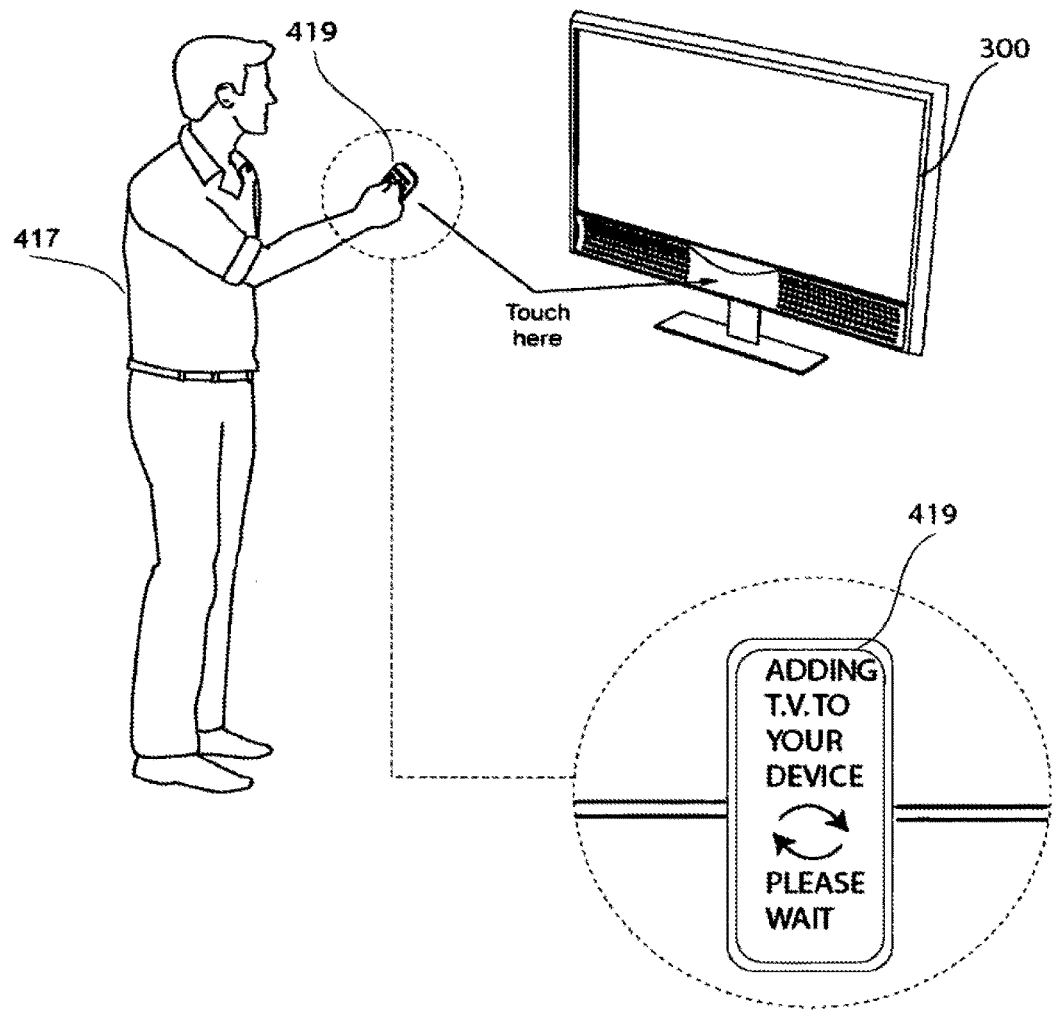
FIG. 4 is a conceptual diagram showing how association between a controller and a device can be achieved using a proximity touch gesture.

FIG. 4 is a conceptual diagram showing how association between a user 417 and their controller 419 and a controllable device 300, which in this instance is a TV can be achieved using a proximity touch technique, and the associated electronic operable interchange shown also as 419.

Figure 5:
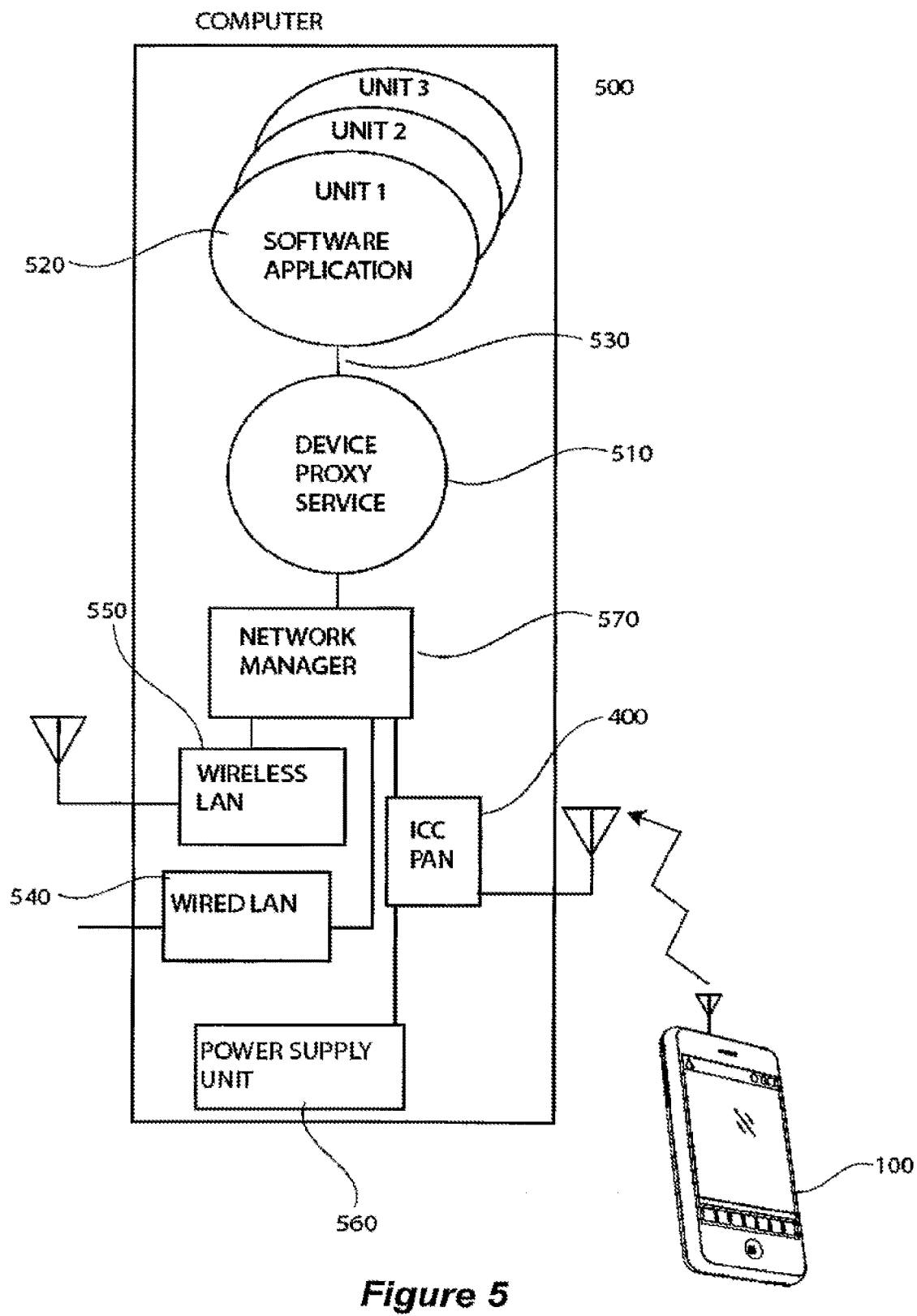
FIG. 5 is a conceptual diagram showing an arrangement whereby software devices can be controlled.

With reference to FIG. 5, the following paragraphs disclose an embodiment of the ADRC Protocol suitable for controlling software applications running on a desktop or laptop computer.

Computer 500 supports one or more communications interfaces for example a wired network adapter 540 or a wireless network adapter 550. These communications interfaces are typically managed by the network manager 570 of the operating system installed on the computer, which makes it convenient for software applications to access network functionality provided by several interfaces. The ADRC Protocol functionality in this embodiment is implemented both as integrated circuit chip 400 and software service 510.

Integrated circuit chip 400 has two main functions. Firstly it acts as a proxy device so that the power supply unit 560 can be commanded to turn on by controller 100. This allows computer 500 to be turned on just like any other appliance. Secondly it provides a PAN communications interface to network manager 570. This allows computer 500 to become an embodiment of controller 100 by implementing 'Soft Controller' functionality thus allowing it to control other devices on a PAN.

Service 510 acts a proxy device so that the software applications on computer 500 can be managed by controller 100 in the same way as any other device. Service 510 accesses network communications facilities via network manager 570 and in addition it provides an Application Programming Interface (API) 530 so that software applications 520 can be developed that use the API and as a result be remotely controlled by controller 100. When software application 520 is installed on to computer 500, the installation procedure additionally registers the application with service 510. This may be achieved for example by copying the application's RDF to the profile cache area of service 510. It is a function of service 510 to make each registered software application appear to be a sub-unit of computer 500.

In the preferred embodiment service 510 will register itself with a LAN based service discovery protocol such as one of the implementations of ZeroConf, for example Avahi for Linux systems or Bonjour for Apple systems. Using its LAN interface 140 and a service discovery protocol, controller 100 can thus discover and associate with service 510 on computer 500 using conventional LAN based methods.

According to the teachings of the present invention, controller 100 will then request service 510 to enumerate its sub-units (in this case the registered software applications). Using descriptive information returned by the enumeration process, controller 100 then determines if it has an RDF for each sub-unit. If not, the RDF and any resources specified therein are provided, installed and activated as previously described. At this point an icon for each registered software application on computer 500 is available on the user interface presented by controller 100.

In the usage phase, device icons (representing the software applications) on the graphical user interface are able to indicate whether the software device is presently on (running) or off (not running). When the user activates an icon of a device that is off, controller 100 sends an 'on command' for the device to service 510 which then sets the associated software application 520 running. When the user activates the 'off button' for a device, controller 100 sends an 'off command' for the device to service 510 which then kills (stops) the software application 520.

When the user activates a command button for a device, controller 100 sends the associated command sequence to service 510 which then passes this on to the associated software application 520 via API 530. Software application 520 subsequently receives the command sequence via API 530 and executes the associated command.

Software application 520 may send data in response to commands to API 530 and service 510 will deliver this to controller 100. For example if the software is a slide show application and the user sends a command to change to the next slide, software application 520 may send the speaker notes for display to the user.

Software application 520 may generate unsolicited event notifications to API 530 and service 510 will deliver these to controller 100. For example if the software is a media player application and a music track is playing then an event could be set to controller 100 every second to update an elapsed time status display.

Service 510 may also provide an interface to the operating system of computer 500. This interface may provide the ability for controller 100 to turn off the computer hardware, configure various settings of the operating system and query the state of the operating system and hardware.

Figure 6:
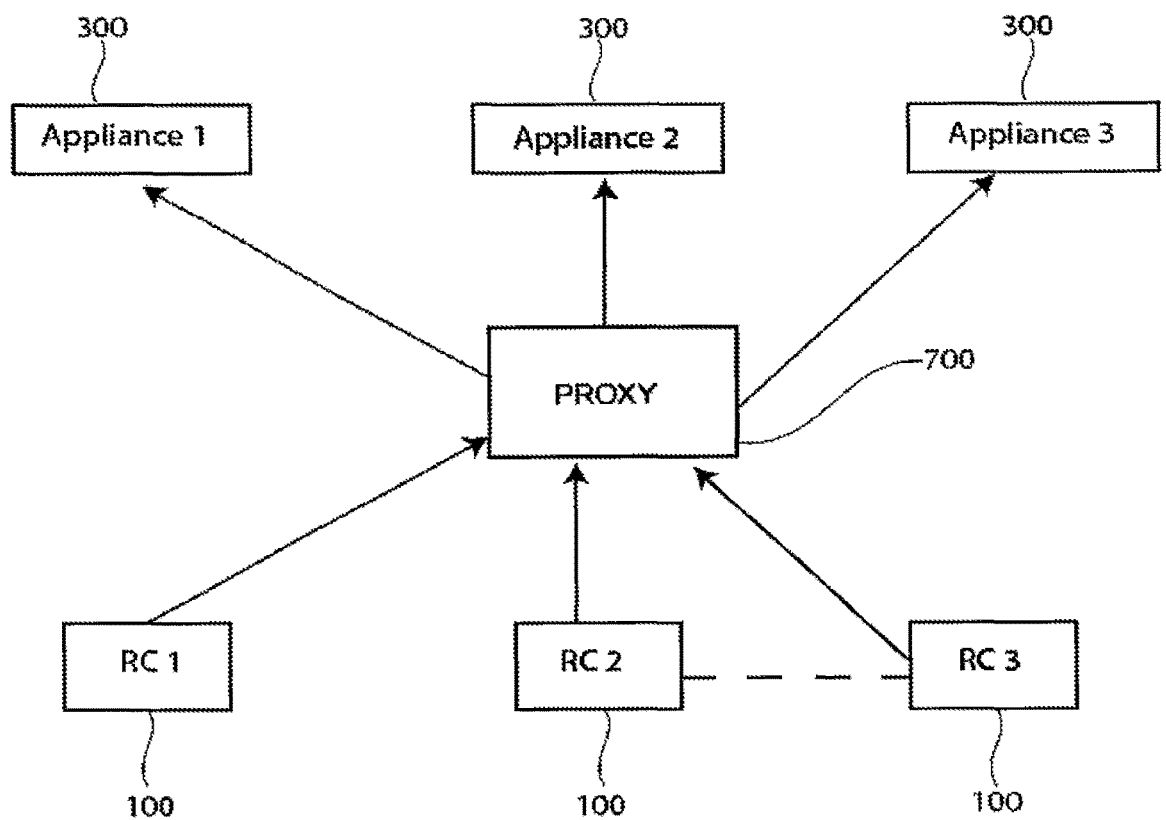
FIG. 6 is a conceptual diagram showing an arrangement where a proxy device is introduced.

With reference to FIG. 6, the following paragraphs disclose an arrangement whereby the task of forming associations between M controllers and N devices is greatly simplified for the user.

In certain PAN based networking systems, the user is required to form associations between each controller M and device N. This becomes inconvenient for the user relatively quickly because the number of associations is M*N (the product of M and N). For example if a home had 3 controllers and 5 devices (e.g. TV, DVD, STB, air conditioner and heating thermostat) then 15 associations would have to be made. This number is bordering on the limit of acceptability. If however another home had 3 controllers and 20 devices (AV equipment, light switches, blind controllers, power points and etc) then the number of associations would be 60, which is obviously inconvenient to setup and difficult to manage.

To alleviate this situation proxy device 700 may be introduced to the remote control system. In this arrangement each device 1 . . . N forms an association with proxy 700 and each controller 1 . . . M also forms an association with the proxy. Hence there are N+M associations. Continuing the previous example, in home 1 there would now be 8 associations compared with 15 and for home 2 there would be 23 associations compared with 60. Thus the introduction of proxy 700 has greatly reduced the number of associations the user has to setup and maintain and hence the resulting system is more convenient and desirable.

Proxy 700 may also behave in a similar way to service 510 described earlier, where each device 300 becomes a subunit of proxy 700. Controller 100 is thus able to use the ADRC Protocol to interact with proxy 700 which will forward on requests from controller 100 to device 300 and responses from device 300 to controller 100 as required.

Figure 7:
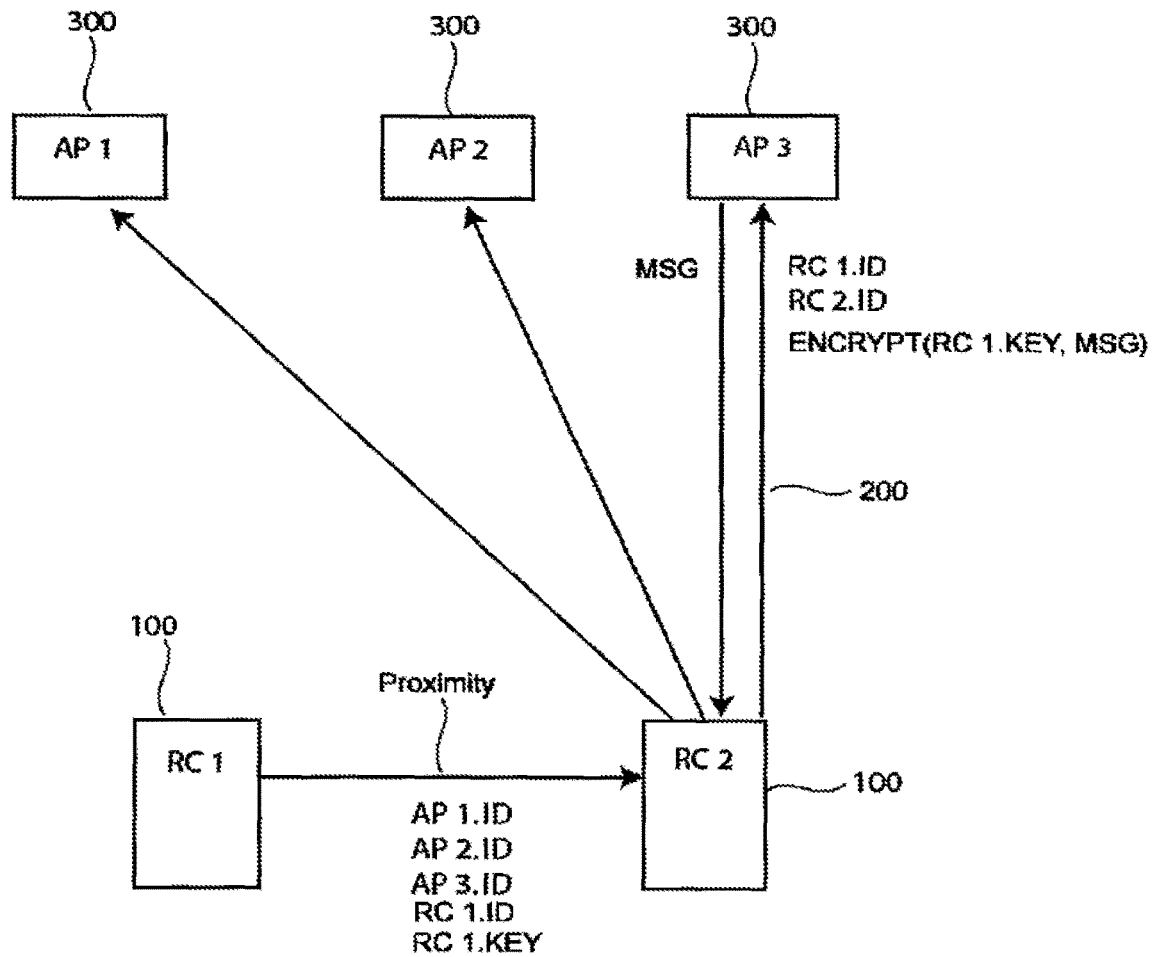
FIG. 7 is a conceptual diagram showing an arrangement between two controllers that can facilitate automatic association between a new controller and existing devices.

With reference to FIG. 7, the following paragraphs disclose an alternate arrangement to that disclosed in FIG. 6 whereby the task of forming associations between M controllers and N devices is achieved without the need for proxy 700.

In order to coordinate the association operation one controller 100 (RC1) is designated as the coordinator and the other controller 100 (RC2) the initiate. RC1 must first have associated with the devices 300 (AP1, AP2, AP3) in the normal way. When RC2 is to be associated with devices 300, the user first associates RC2 with RC 1 using the Proximity Gesture. Once this has been achieved the assisted association process continues by RC 1 sending its own identifier (RC1.ID), its own private key (RC1.KEY) and association information for each of devices 300 (AP1.ID, AP2.ID, AP3.ID) to RC2 via a proximity communications link, which by nature is secure. The process continues when RC2 connects with each of devices 300 in turn and associates with them. In order to associate with Device 300, RC2 establishes a wireless communications link with it and requests association. Before association is permitted, trust must be established between Device 300 and RC2. To establish trust, Device 300 formulates random message MSG and sends it to RC2. RC2 then uses RC1.KEY to encrypt MSG using a symmetric encryption algorithm and sends its association information RC2.ID, the identity of the trusted coordinator RC LID and the encrypted message ENCRYPT(RC1.KEY, MSG) to device 300. Device 300 looks up its internal association information for RC1 and obtains RC1.KEY and uses it to encrypt MSG and compares the result with ENCRYPT(RC1.KEY, MSG) sent by RC2. If the values match then Device 300 has established trust in RC2 and the association between RC2 and Device 300 is established.

Figure 8:
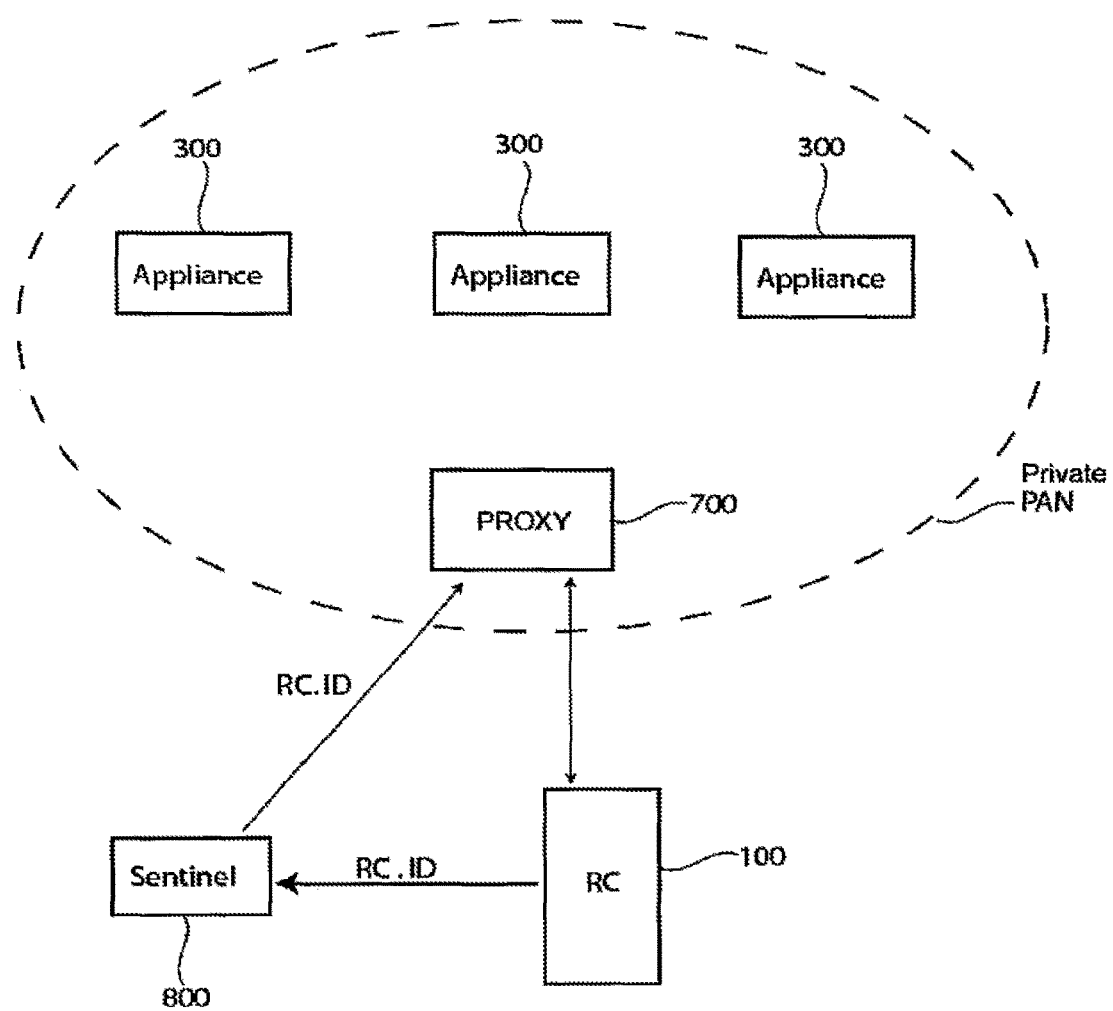
FIG. 8 is a conceptual diagram showing an arrangement by which a sentinel device can facilitate the association between a controller and devices on a PAN.

With reference to FIG. 8, the following paragraphs disclose an arrangement whereby a controller can be securely introduced to a closed network of devices.

In certain situations it may be beneficial to configure a group of devices that participate on a closed PAN whereby it is not ordinarily possible for a controller to discover or make associations with devices in the PAN. An example of such an arrangement is a hotel. Each room in the hotel may have a number of devices that a guest may wish to use their controller to control such as a TV, thermostat, various lights and lamps, clock radio and the like. It would not be a satisfactory situation if any controller could freely make associations with devices in the room. If this were the case then a guest in an adjacent room could 'take control' of their devices, but mores the point that any guest would be overwhelmed by the devices that their controller could potentially discover including devices in their own room and those in adjacent rooms and perhaps even devices in other buildings nearby. Further examples include offices and other buildings that use consumer equipment to interface with the public and need to exclude the public from interfering with that equipment.

To alleviate this situation sentinel 800 is introduced to the remote control system. Sentinel 800 is a trusted device. Using an arrangement based on that disclosed in FIG. 6, the closed PAN in a room consists of a proxy 700 and a number of devices 300 that have been previously associated with the proxy. These form a closed PAN and will not permit association from any controller. The proxy may be a functional device in its own right such as the lock on the room door. Proxy 700 is configured so that it will only allow association with a controller that sentinel 800 has introduced to it. Sentinel 800 may be located at the hotel reception desk. When a guest checks in hotel staff assign them a room and these details are passed on to sentinel 800, then the guest's controller 100 is presented to sentinel 800 which authenticates it. If controller 100 is successfully authenticated, sentinel 800 sends the identity of controller 100 to proxy 700 of the room the guest has been allocated and the association information of proxy 700 may optionally be provided to controller 100. Now when the guest presents controller 100 to proxy 700, which may be the door lock and may have the Proximity Gesture capability, the proxy will accept the association request from controller 100. Once controller 100 has associated with proxy 700 it can control the devices in the room's PAN in the same manner as previously described for FIG. 6. Finally when the guest checks out, sentinel 800 can send an instruction to proxy 700 to disassociate with controller 100.

Figure 9:
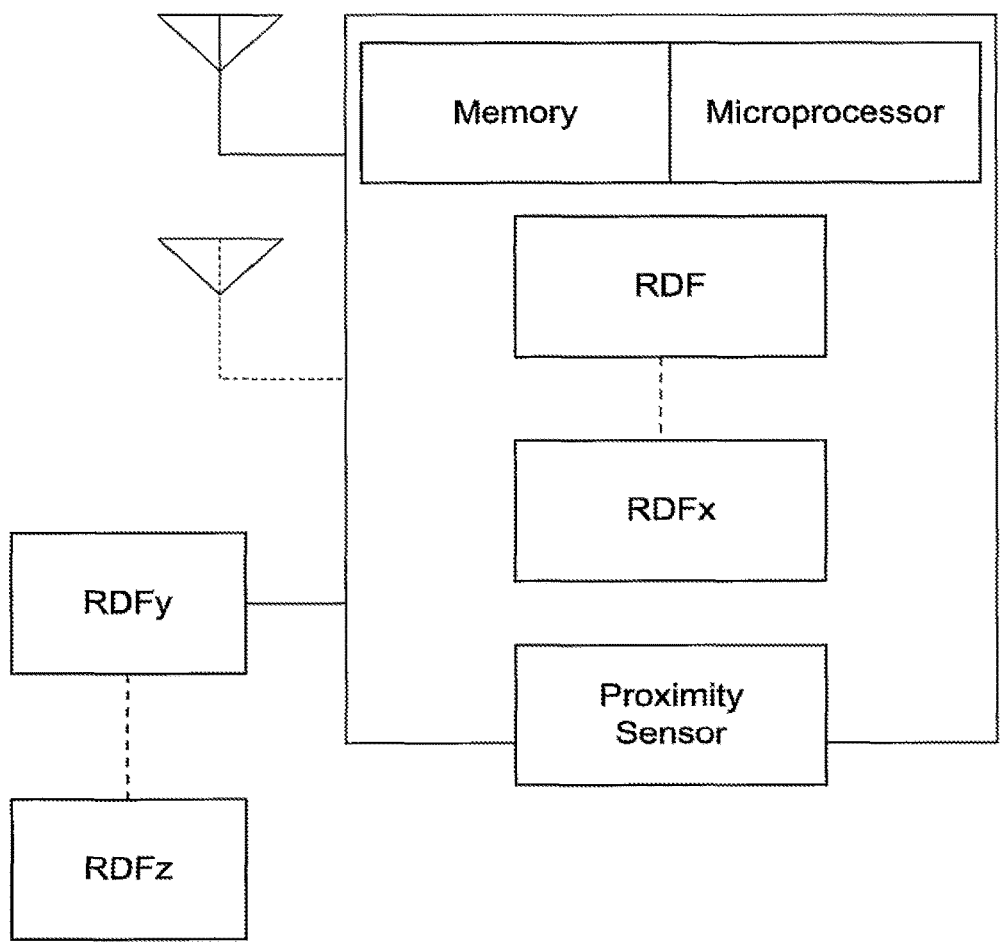
FIG. 9 is a block diagram showing a first device (controllable device).

FIG. 9 discloses a controllable device that comprises a microprocessor, memory, proximity sensor, proximity communications mechanism, optionally a wireless communications mechanism, at least one internal RDF and optionally other RDFs that may be stored externally.

Figure 10:
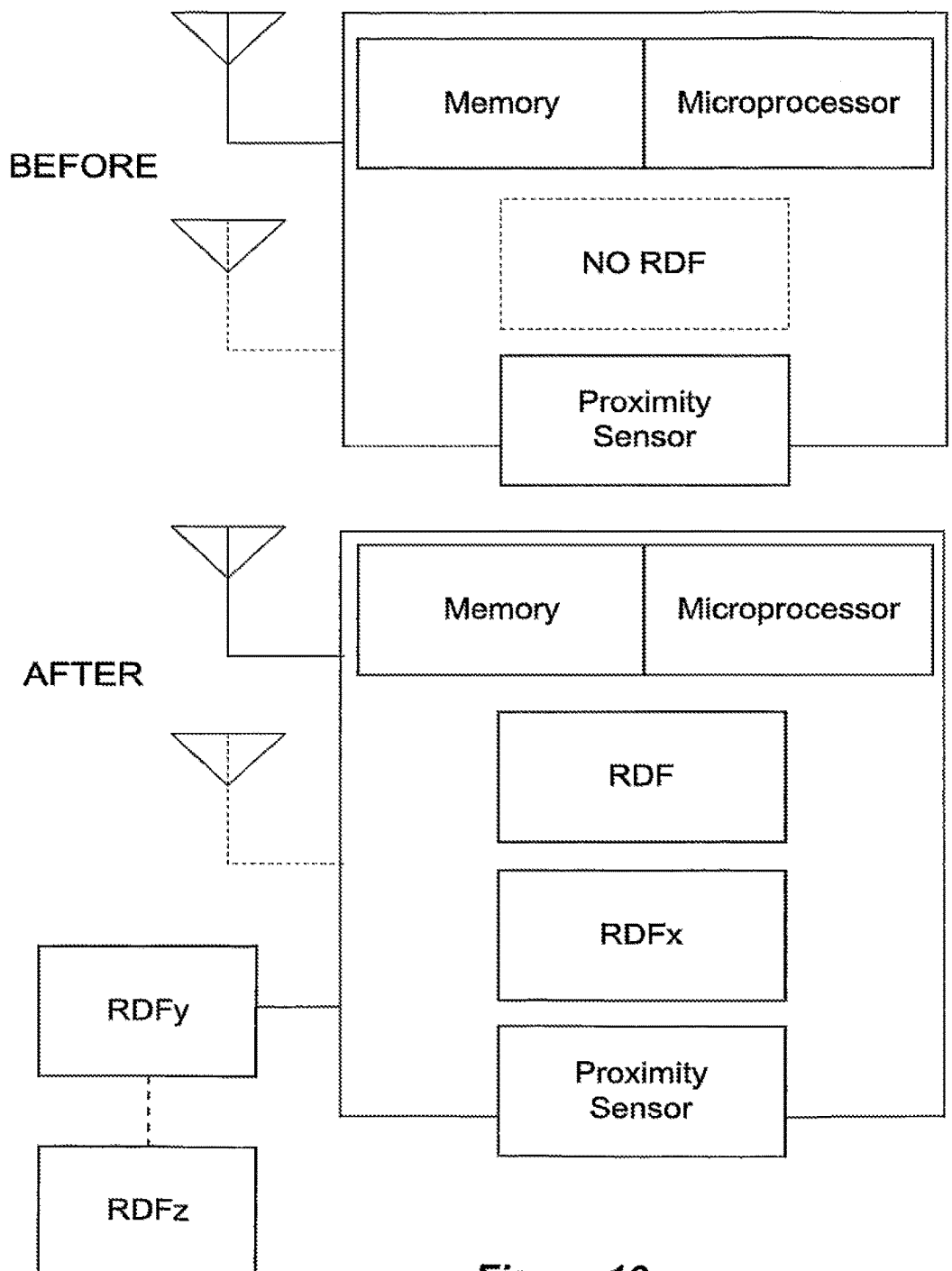
FIG. 10 is a block diagram showing a second device (controller) both before and after association with a first device.

FIG. 10 discloses a controller that comprises a microprocessor, memory, proximity sensor, proximity communication mechanism, optionally a wireless communications mechanism and initially no RDF for any device. After association with a controllable device the controller will contain at least one RDF from the device and optionally a reference to other RDFs stored externally to the controllable device.

Figure 11:
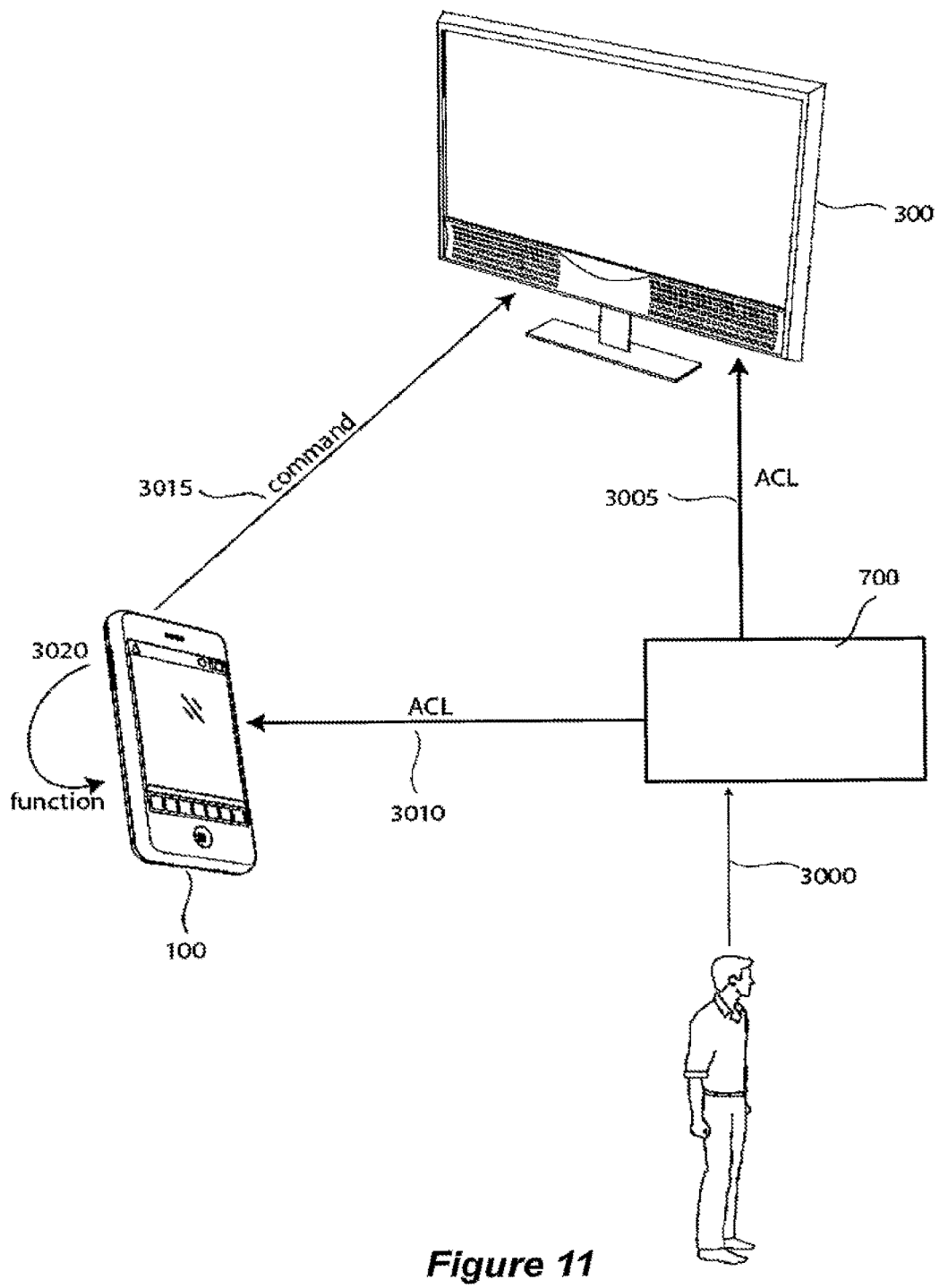
FIG. 11 is a conceptual diagram showing an arrangement between an access control device, controller and device where access controls are introduced in to the remote control system.

With reference to FIG. 11, the following paragraphs disclose an arrangement where an access control device 700 is introduced that coordinates access controls with controller 100 and device 300.

In some remote control installations, it may be advantageous to restrict various operations that can occur. For example a homeowner may wish to restrict which controllers can associate with the devices in the home to only those controllers belonging to members of the family or even perhaps to only one 'master' controller. Furthermore, it may also be beneficial to restrict the functionality available on specific controllers. For example a parent may choose to restrict the availability of Internet access on their child's controller to certain times of the day or to limit data bandwidth to a daily quota.

A user with appropriate privileges may create access control information 3000 on access control device 700. This may be accomplished using a software application specially designed for the purpose.

Once the desired access control information has been created or updated, access control device 700 sends out Access Control List (ACL) 3005 to any affected device 300 and ACL 3010 to any affected controller 100. Now when controller 100 sends command 3015 to device 300 the device checks against the appropriate ACL to determine whether controller 100 has permission to execute the requested operation.

If controller 100 does not have permission then device 300 does not action the request but instead informs the controller why the request was refused. Similarly when a user of controller 100 requests access to a particular function 3020, controller 100 checks against the appropriate ACL to determine whether the function should be provided or not.

Figure 12:
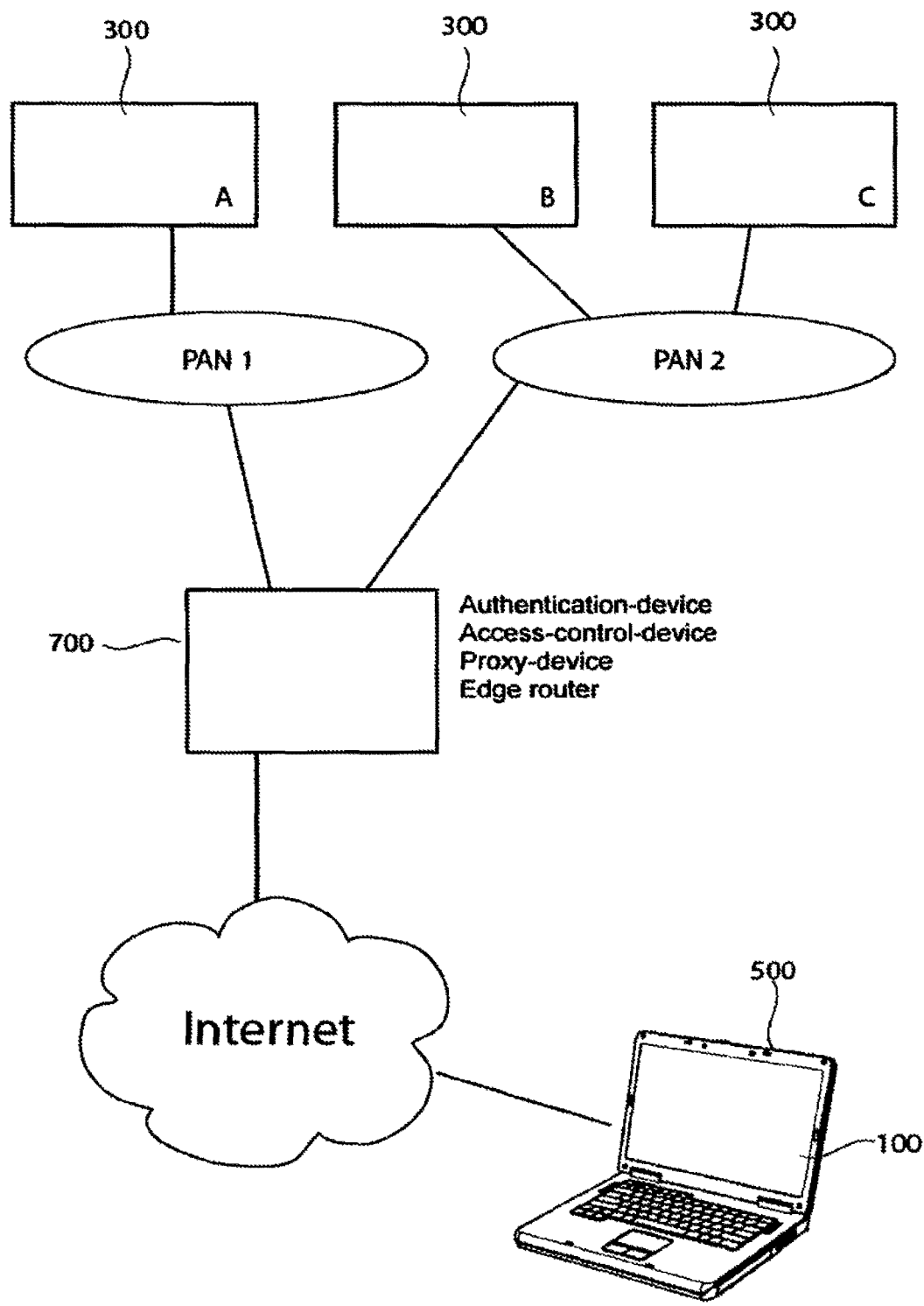
FIG. 12 is a conceptual diagram showing an arrangement where devices on one or more PANs can be controlled by a controller in a remote location.

With reference to FIG. 12, the following paragraphs disclose an arrangement where device 700 provides remote access to controller 100 at another location that is out of range of the wireless communications link 200.

Some users may find it advantageous to be able to control and receive event notifications from devices in their home whilst at a remote location such as their place of work. For example if it was discovered that a user had left home without turning off the air conditioning, then they could correct the situation when they got to work, or in general from any location where they had access to the Internet.

In another example, if a device generated an event, then this could also be routed to a controller at a remote location so that the user could be alerted and consequently take some appropriate action.

Device 700 is configured to be able to communicate with devices 300 on one or more PANs. These PANs do not necessarily have to use the same technology, for example PAN I may be a Bluetooth 3 network and PAN2 may be an ultra wide-band (UWB) network. Device 700 is also configured to connect to the Internet via some LAN networking means, for example via a Wi-Fi™ access point or a DSL modem or the like. Computer 500 is at a remote location and has a connection to the Internet.

A software application that embodies the ADRC Protocol is installed on computer 500. This 'SoftRemote' 100 may have been downloaded from a server on the Internet. Furthermore, device 700 implements one or more gateway means that enable it to reformat network packets and route them between one network and another.

For example, computer 500 may send a UDP/IP packet to device 700 which reformats it in to one or more Bluetooth packets and routes these to PAN1. Finally as disclosed earlier, hub 700 also acts as a proxy device so that each device 300 appears to be one of its subunits. Now 'SoftRemote' 100 is able to use the ADRC Protocol to interact with devices 300a, 300b and 300c via device 700 as if they were local.

Figure 13:
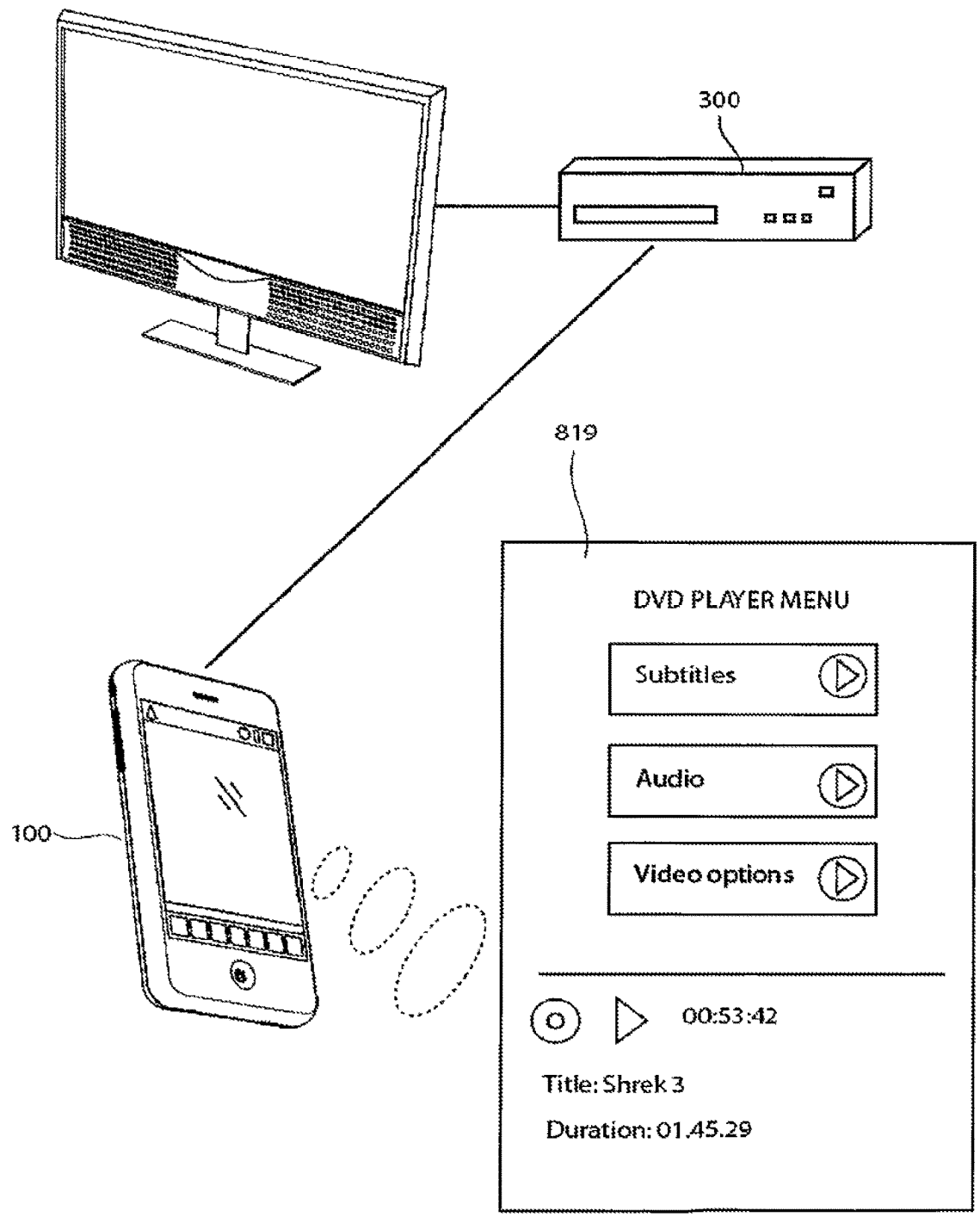
FIG. 13 is a conceptual diagram showing how devices may display menus and other status information on the display of the controller instead of the TV.

With reference to FIG. 13, the following paragraphs disclose an arrangement where device 300 uses the display of controller 100 for the display of menus and status indications and the like.

Some devices can be made more cheaply because they provide only a very basic method of interacting with the user. For example a modern DVD player has only a very basic display with a few buttons, thus it relies on a TV and remote control to provide a fully functional user interface. This technique is commonly referred to as On Screen Display (OSD). However, using OSD interferes with the viewing of the main program for any other viewers, which under some circumstances may be most annoying. It would therefore be highly desirable if any OSD menus or other status information were displayed on controller 100 instead of on the TV.

As disclosed earlier, the RDF associated with device 300 contains information that declares the functions that the device responds to, which together with associated style sheets and transformation file may also be used to describe the setup and configuration screens similar to those currently presented on the TV for configuring certain settings such as picture, sound and other setup parameters.

Due to the flexibility provided by the present invention, highly appealing and easy to use menu/control interfaces may be described that can be activated directly with simple gestures instead of navigating through a system of menus using cursor keys. These may also include program related information such as the title of the program, its duration and other metadata that may be available. In addition status information such as mode (e.g. play, pause, stop), running time, remaining time etc. may also be displayed and updated in real-time where controller 100 uses the API of the device as described in its RDF to query such information, and device 300 sends events to controller 100 to update status as appropriate.

Figure 14:
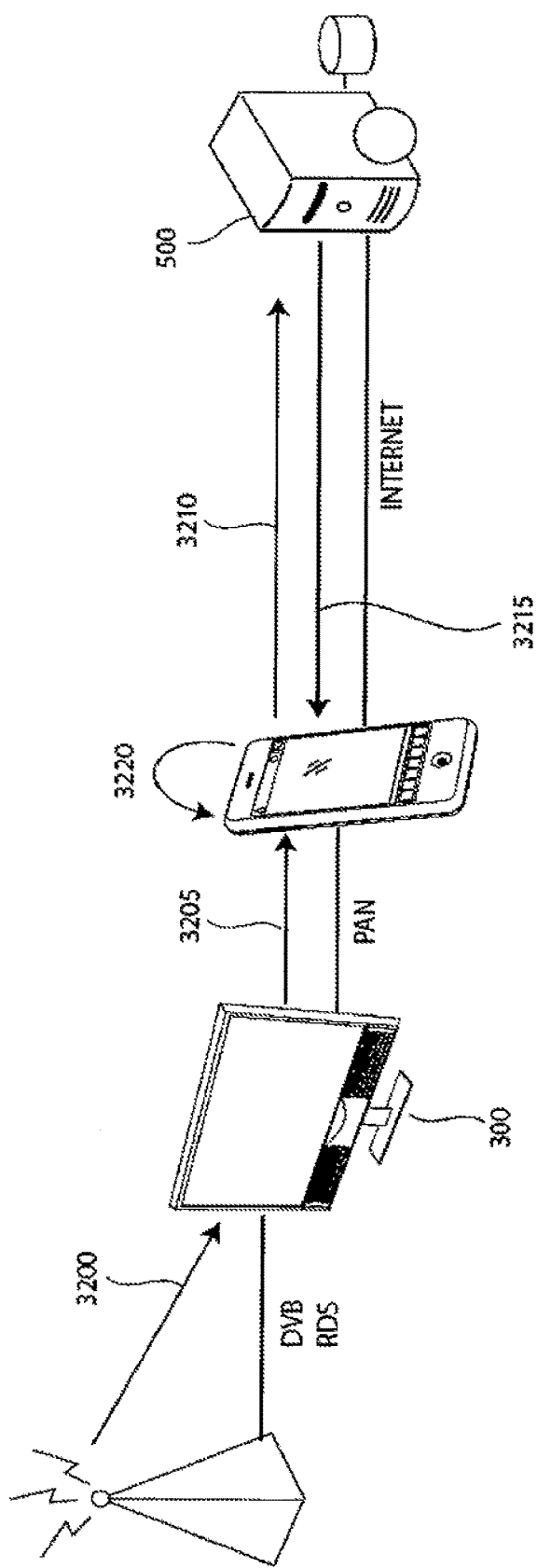
FIG. 14 is a conceptual diagram showing how information may be broadcast over a free to air network and be received by a device and communicated as an event to a controller.

With reference to FIG. 14, the following paragraphs disclose an arrangement where device 300 receives information broadcast over free to air networks and generates corresponding events to controller 100.

There currently exist free to air broadcast media services that are able to transmit digital information along with the actual program content. For example the Digital Video Broadcast (DVB) system is able to transmit station name, EPG and other data along with the television program content. Similarly the Radio Data Service (RDS) is able to transmit station name, program name and other data along with the FM audio program content.

The operator of the free to air network is able to broadcast digital data 3200 over their network as they may choose and furthermore they are also in a position to time the delivery of such data to match the program content. This presents a beneficial arrangement when the receiving device 300 is able to receive such data and subsequently send an unsolicited event 3205 to notify controller 100. Event 3205 may contain information such as a URL, trigger condition, text or any data. When controller 100 receives event 3205 it may act on it accordingly.

For example if event 3205 contained a URL to a webpage, controller 100 may choose to render this page and display it to the user. The webpage may be a web application that allows the user to interact 3210 with server 500 and in turn for server 500 to make appropriate responses 3215 to the user. Furthermore if event 3205 contained a trigger condition then controller 100 may choose to activate an appropriate handler resource 3220 informing it of the trigger condition. This handler may then use personalization information stored in controller 100 to display highly targeted or personalized information to the user.

To put this arrangement in to context, a TV station may be broadcasting a sports event such as a football match. The match enters quarter time and the TV station sends information containing a URL over the DVB. A sports fan is watching the match on a TV that implements the present invention. The TV receives the information from the DVB broadcast and reformats it as an event and sends it to the remote control.

Figure 15:
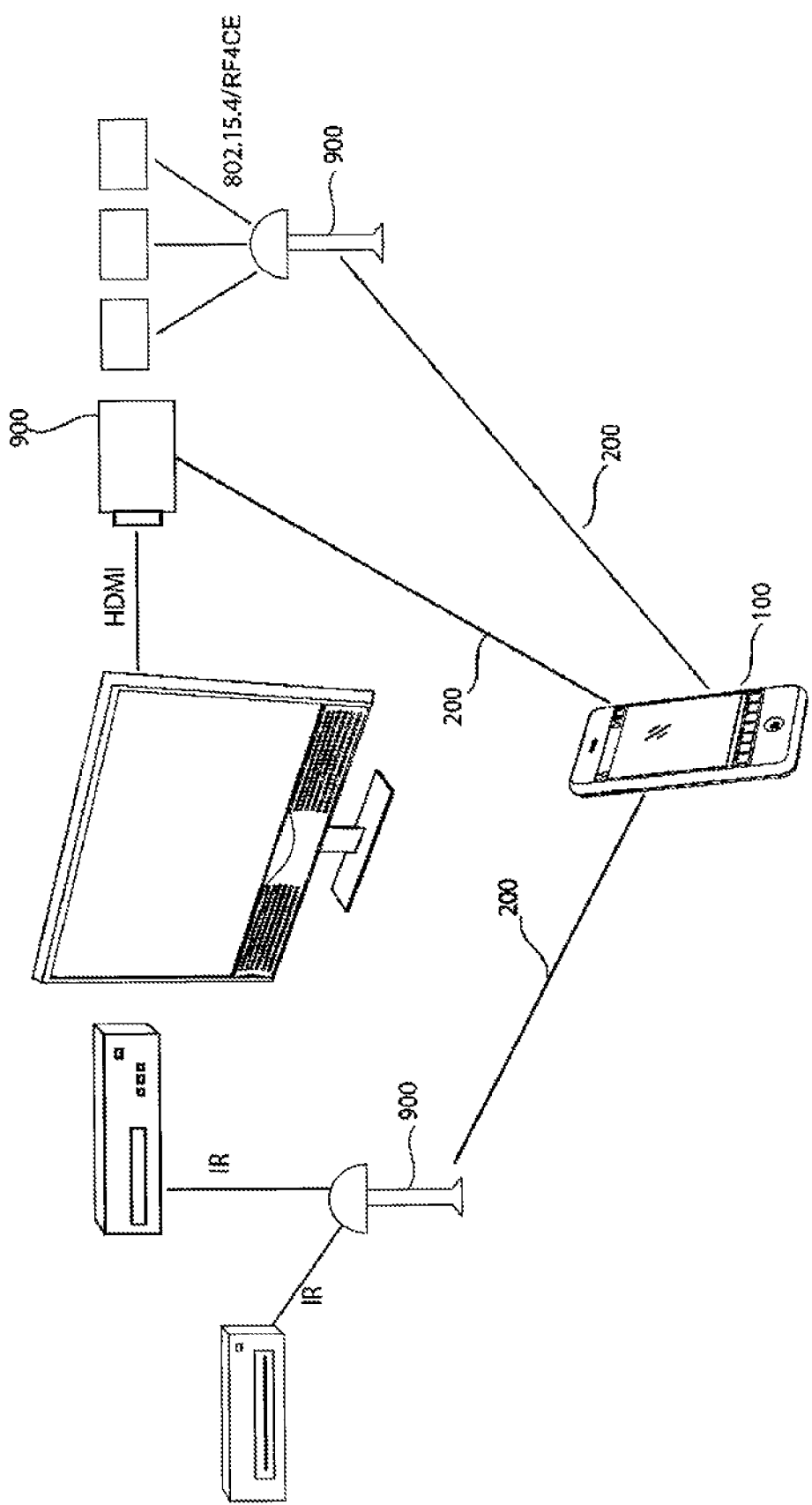
FIG. 15 is a conceptual diagram showing gateway devices transforming communications from a controller to formats suitable for controlling devices that implement existing remote control technologies.

The remote control receives the event and invokes the associated handler resource. The handler opens up a popup window on the remote control screen and directs it to the URL provided in the event. The URL is that of a web application that implements an on-line ordering system for a pizza delivery company. The user is alerted to the event by an audible event tone. The user picks up the remote control and sees the pizza offer on the screen. The pizza company has a game special that seems to be good value so the user orders. Thirty minutes later the order is delivered and it is just in time for half time, so the user is most satisfied with the service provided. With reference to FIG. 15, the following paragraphs disclose an arrangement whereby appliances that do not embody the present invention (first, second and third generation remote control technologies) can still be controlled by controller 100.

The appliance has an existing control interface which may be infrared communications or some other radio frequency type. The appliance may also have one or more HDMI ports that can respond to CEC commands. In this embodiment, gateway 900 is also able to convert communications on wireless communications link 200 from controller 100 into a form compatible with the remote control technology of the appliance.

Gateway 900 also behaves in a similar way to proxy 700 described earlier in that it acts as a proxy device thus each appliance becomes a sub-unit of gateway 900. Controller 100 is thus able to use the ADRC Protocol to interact with gateway 900 and gateway 900 forwards on commands from controller 100 to one or more appliances using the correct communications medium.

For example if an appliance has an infrared remote control, gateway 900 will receive commands from controller 100 over the wireless communications link 200 and then modulate an infrared signal to communicate the command to the appliance. In another example, if an appliance has a HDMI port that supports control via the CEC command set, then gateway 900 will receive commands from controller 100 over wireless communications link 200 and then reformat the command to its corresponding CEC format and send it to the appliance via the CEC pin of the HDMI port.

In a further aspect of the present invention, controller 100 is able to execute one or more software applications in addition to those that provide remote control functionality.

In order to conduct effective advertising campaigns and for product design purposes, it is important for Consumer Equipment (CE) manufacturers to understand how their appliances are used, who uses them, when they are used and so on. Such information is currently gathered by conducting time-consuming public surveys.

However, due to the nature of the present invention, controller 100 as part of its normal usage can gather usage information automatically. For example as the user commands devices via the user interface, controller 100 can keep a record of each interaction.

The information stored for an interaction may include:
Device manufacturer, model and class Command issued
Date and time stamp
Demographic information about the user such as country, postcode, age, sex (from the controller personalization details)

Controller 100 can periodically pre-process stored records and then forward these to a server on the Internet for aggregation, analysis and reporting.

The broadcast industry routinely gathers information on viewer and listener behaviour through the use of surveys. However, due to the nature of the present invention, information can be gathered automatically by controller 100.

As the user commands devices via the user interface, controller 100 can query the device for program information and keep a record of each interaction. The information stored for an interaction may include:
Program name
Broadcaster
Date and time stamp
Demographic information about the user such as country, postcode, age, sex (from the controller personalization details)

Controller 100 can periodically pre-process stored records and then forward these to a server on the Internet for aggregation, analysis and reporting.

Figure 16:
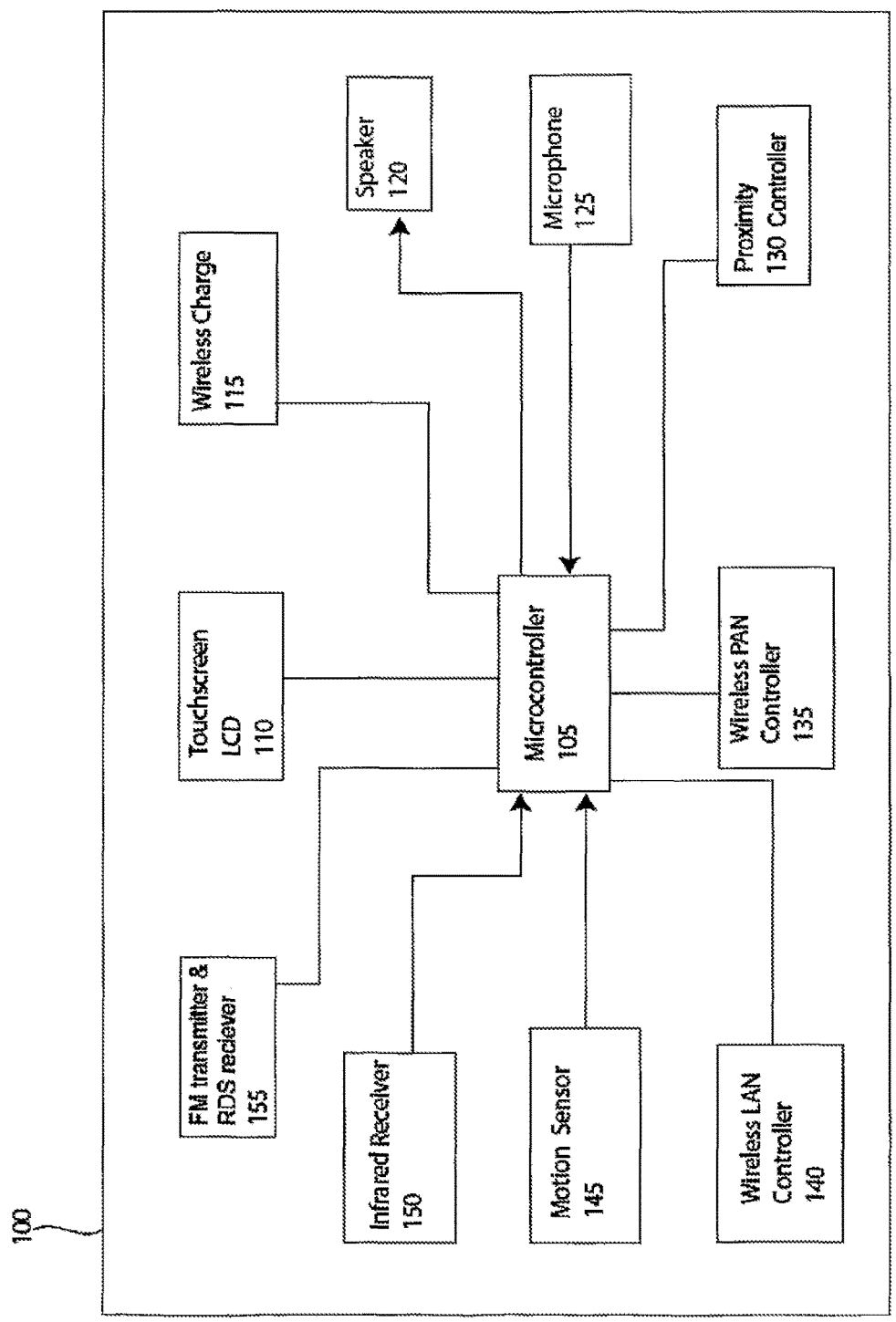
FIG. 16 is an internal block diagram of the preferred embodiment of a controller in accordance with the present invention.

FIG. 16 discloses the major hardware blocks according to the preferred embodiment of controller 100. Microcontroller 105 interfaces with the various blocks and also executes the software that implements the remote control functionality, protocols and other applications. A touch screen LCD block 110 is provided for displaying dynamically generated graphical control interfaces to the user and receiving user input. A wireless charging block 115 is provided for charging the internal battery without the need for a physical connection. A speaker block 120 comprising one or more loud speakers is provided for alerting the user to notifications from devices (e.g. alerts or status changes) and to enable audible feedback for certain user interface operations. A microphone block 125 is provided for receiving voice commands from the user. A Proximity Controller block 130 is provided for low data rate, short-range communications between controller 100 and external device 300 over distances of a few centimeters. A wireless network controller block 135 is provided for medium data rate PAN communications between controller 100 and external device 300 over distances of tens of meters. A wireless LAN block 140 is provided for high data rate LAN communications between controller 100 and a communications hotspot or external device 300. A motion sensor block 145 is provided for determining when controller 100 is stationary and when it is moving for controlling power modes. An infrared receiver block 150 is provided for receiving infrared signals output by existing infrared remote controls so that these can be learned. An FM block 155 is provided for transmitting audio content to external devices and for receiving information broadcast over free to air FM services.

Figure 17:
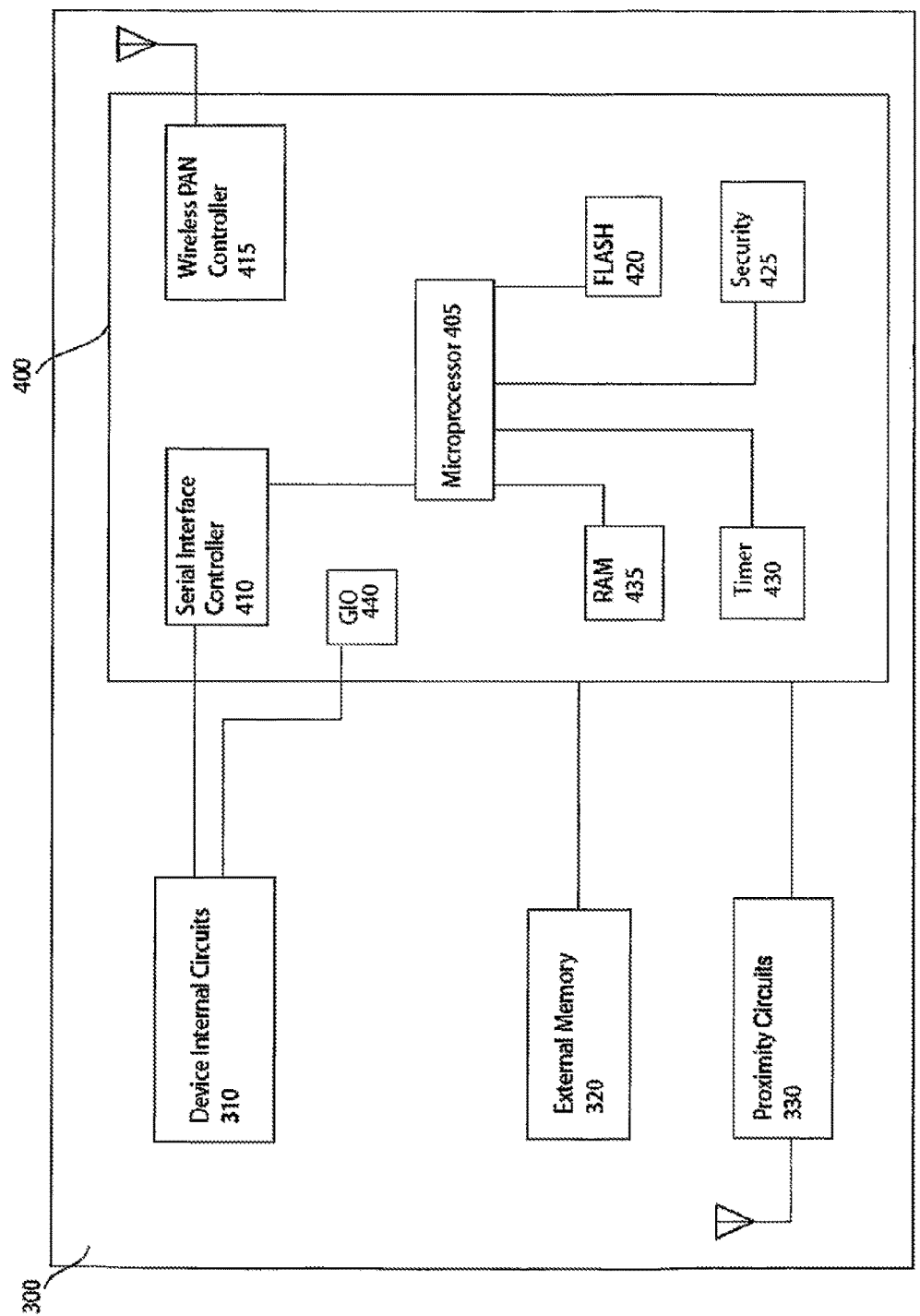
FIG. 17 is an internal block diagram of the preferred embodiment of a device in accordance with the present invention.

FIG. 17 discloses the major hardware blocks according to the preferred embodiment of device 300 and integrated circuit chip 400. It should be noted that device 300 is any general device, examples of which include proxy 700, sentinel 800 and gateway 900, consumer equipment, scientific equipment, medical equipment and industrial equipment. Microprocessor 405 interfaces with the various blocks of 400 and also executes the software that implements the device proxy functionality, protocols and other applications. A serial interface controller block 410 is provided for interfacing with the internal circuits 310 of device 300 to provide data communications. A general input/output (GIO) block 440 is provided for interfacing with the internal circuits 310 of device 300 to provide stimulus or control signals. A wireless network controller block 415 is provided for medium data rate PAN communications with controller 100. A FLASH memory block 420 is provided for storing software and data. A security block 425 is provided for authentication and encryption capabilities. A timer block 430 is provided for accurate timing for communications and other system functions. A RAM memory block 435 is provided for working memory for microprocessor 405. An optional external memory block 320 is provided for larger storage capacity for resources. A Proximity circuits block 330 is provided to allow the integrated circuit chip 400 to provide proximity detection and low data rate short-range communications to controller 100 over distances of a few centimeters.

Figure 18:
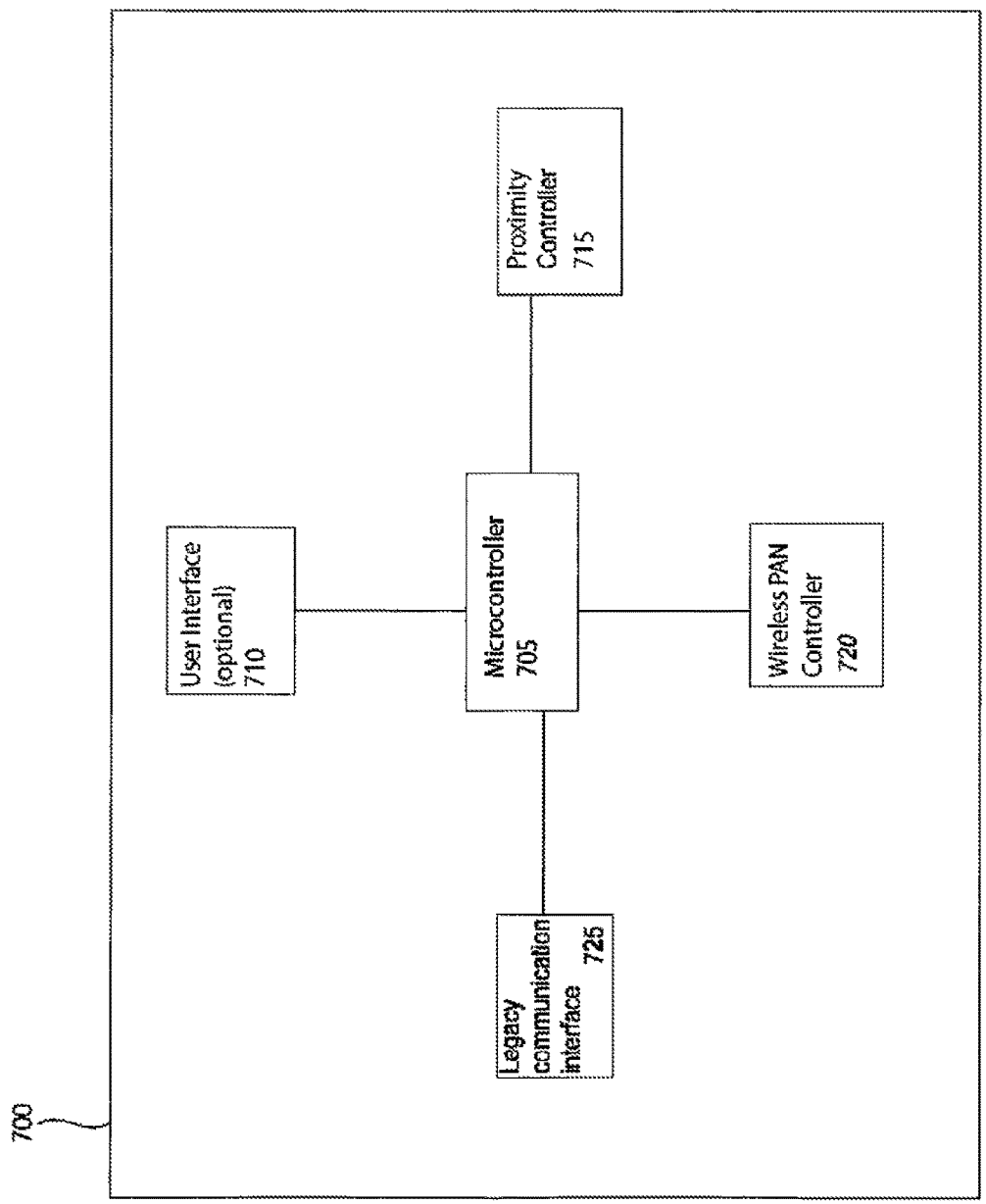
FIG. 18 is an internal block diagram of the preferred embodiment of a gateway device in accordance with the present invention.

FIG. 18 discloses the major hardware blocks of the preferred embodiment of gateway 700. Microcontroller 705 interfaces with the various blocks and also executes the software that implements the gateway functionality, device proxy, protocols and other applications. An optional user interface 710 is provided for displaying status or information to the user and receiving user input. A Proximity Controller block 715 is provided for low data rate short-range communications between controller 100 over distances of a few centimeters. A wireless PAN controller block 720 is provided for medium data rate communications to controller 100 and devices 300. A Legacy communications interface block 725 is provided to communicate with appliances that do not conform to the present invention.

Figure 19:
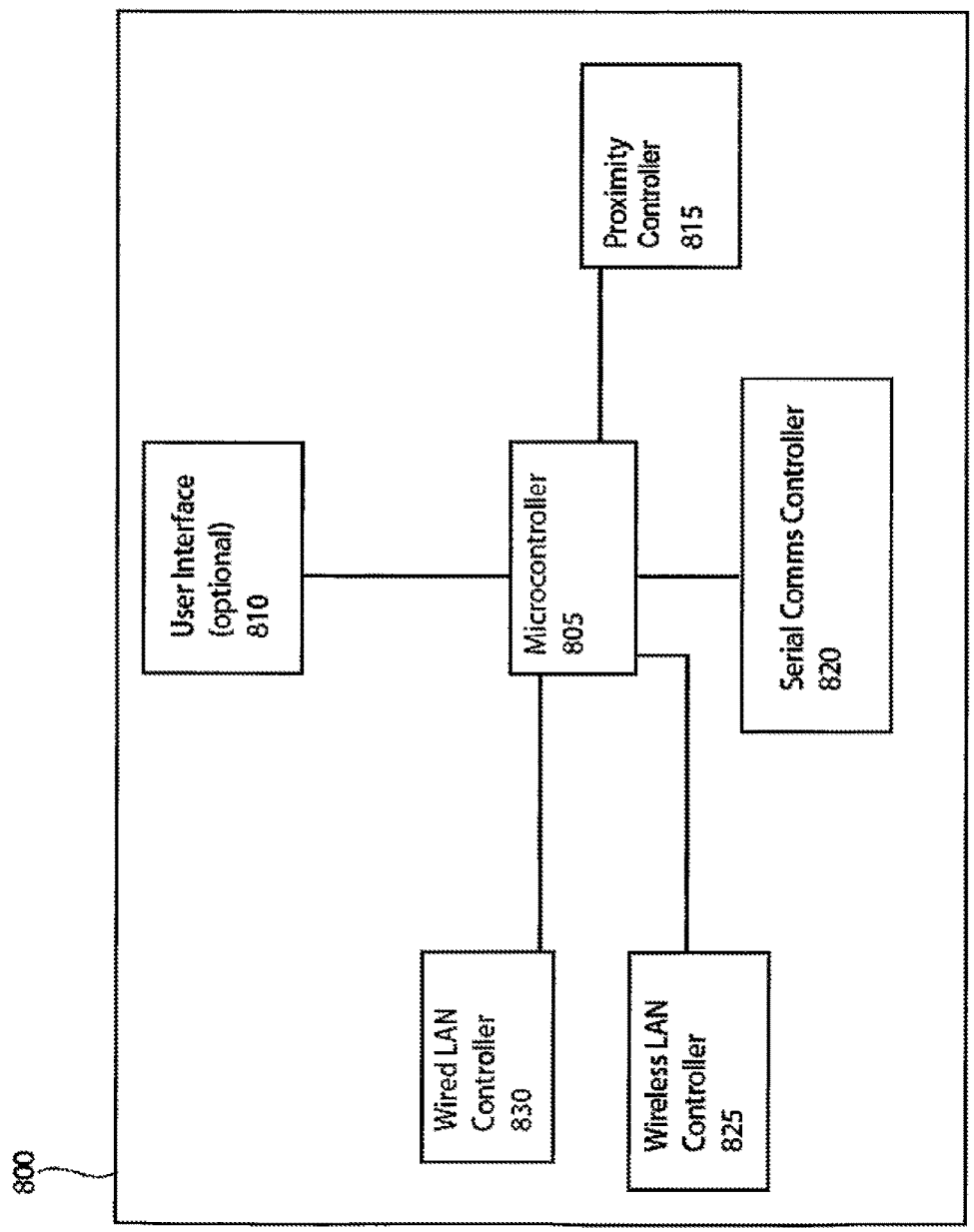
FIG. 19 is an internal block diagram of the preferred embodiment of a sentinel device in accordance with the present invention.

FIG. 19 discloses the major hardware blocks of the preferred embodiment of sentinel 800. Microcontroller 805 interfaces with the various blocks and also executes the software that implements the sentinel functionality, protocols and other applications. An optional user interface 810 is provided for displaying status or information to the user and receiving user input. A Proximity Controller block 815 is provided for low data rate short-range communications to controller 100 over distances of a few centimeters. A serial communications block 820 is provided for USB and RS232 communications to a computer or device. A wireless LAN block 825 is provided for high data rate communications to an application server or device. A wired LAN block 830 is provided for high data communications to an application server or device.

With reference to FIG. 20, the following paragraphs disclose the detailed logic flow of the ADRC Protocol through the full lifecycle of an association with a device.

At step 2000 the user brings controller 100 into proximity range of device 300 and at some point, step 2002, device 300 detects the presence of controller 100. The situation is depicted conceptually in FIG. 4.

At steps 2004 to 2006 the device and controller exchange 'detection' tokens via a proximity communications channel established between them. The detection tokens may include information such as:
  whether an alternate speed for the proximity link should be used;
  whether authentication is required;
  which wireless communications interfaces are supported;
  for each supported communication interface the appropriate characteristics for example for a wireless LAN interface relevant information would include: 802.11 version e.g. blgln, WEP or WPA security, AES-CCMP encryption and etc.

Steps 2008 and 2012 apply if device 300 requires controller 100 to authenticate. If authentication is required then an appropriate technique is employed here. In the preferred embodiment a PKI technique involving digital certificates and the exchange of randomly generated secrets would be employed. To facilitate this both the controller and the controllable device will have at least digital certificates and asymmetric encryption keys. If lesser levels of trust are acceptable for an application then other techniques may be substituted which may require symmetric encryption keys.

Steps 2010 and 2014 apply if controller 100 requires device 300 to authenticate. If authentication is required then an appropriate technique is employed here. In the most exemplary embodiment a PKI technique involving digital certificates and the exchange of randomly generated secrets would be employed. If lesser levels of trust are acceptable for an application, then other techniques may be substituted.

At step 2016 device 300 decides whether it will allow association with controller 100. This decision may be based on various criteria such as whether an association has already been formed with another controller or perhaps an access control list scheme is in use whereby only nominated controllers are allowed to associate with the device.

If the device failed authentication at step 2014, the user may still be given the opportunity to allow association to continue. This may be appropriate when the user is in a position to know something about the device that enables them to trust it.

At steps 2018 to 2020 the device and controller exchange 'association' tokens via a proximity communications channel established between them. The association tokens may include information such as:
  network identity for example the PAN ID of an RF4CE network;
  any password, passphrase, key or parameter required to connect with the other party via the PAN/LAN for example an RF4CE device that requires an encrypted link requires the Key Exchange Transfer Count to be specified;
  network address;
  network channel number;
  protocol; and
  other tokens as appropriate.

At steps 2022 to 2024 it is determined whether association tokens were exchanged successfully. If so, association can be initiated. If association is not possible the user is informed at step 2042.

At steps 2026 to 2028 device 300 and controller 100 form an association with each other whereby they can now open a communications channel and freely communicate information. For example if the network is a wireless LAN then the association can be described by: SSID, security method and key, IP address, protocol and port number.

At step 2200 controller 100 determines whether it already has an RDF to match with the descriptive information for each sub-unit returned by device 300 at step 2102. For those RDFs that it does not have, controller 100 uses steps 2202 to 2204 to attempt to retrieve the RDF directly from device 300. For those RDFs that cannot be retrieved from device 300, controller 100 uses step 2210 to attempt to retrieve the RDF from the indicated link. If no link was indicated controller 100 uses step 2212 to attempt to retrieve the RDF from a default URL. The indicated link and default URL may be on server 500 and accessed via network 600. If at step 2214 the RDF has not been obtained this is indicated to the user at step 2216.

At step 2220 controller 100 uses information contained in the RDF to determine whether any further resources are required to control the associated sub-unit of device 300. In the present invention resources refer to items that may be required by the controller to perform its control function such as data, software applications and plug-ins, style sheets and the like.

If resources are indicated in the RDF and controller 100 does not already have these then using steps 2222 to 2238 it attempts to retrieve and install each of these using the sequence previously described for retrieving the RDF. Once the RDF and any other required resources have been acquired, at step 2240 controller 100 uses information contained in the RDF to generate a graphical user interface that is necessary and sufficient for controlling device 300.

A further purpose of the RDF is to specify how events generated by device 300 are to be handled. The RDF provides a means for associating device events with handling resources on controller 100 such that when an event is received it is forwarded on to the associated handler resource.

Yet a further purpose of the RDF is to provide a means for describing the input and output facilities provided by device 300. For example a TV device may have two inputs AV1 and HDMI1 and one output MONITOR. This information is especially useful for applications that may be developed to help the user to setup and configure their system.

At steps 2242 to 2244 controller 100 sets running any resources that are marked in the RDF for automatic invocation.

At step 2100 controller 100 uses wireless communications link 200 to device 300 and requests the device to enumerate its sub-units. For hardware devices such as Audio Visual (AV) equipment a sub-unit is a unit of equipment that performs a well defined function for example a TV would have just one sub-unit (itself) whilst a combined TV/DVD would have two sub-units (TV and DVD). For computers such as PCs or servers a sub-unit is a software application or service. For example a PC may have a music player application and a game application installed whereas a server may offer services such as a location service and a payment service amongst others. Each subunit will require its own unique set of information in order to be controlled.

At steps 2102 device 300 enumerates though its sub-units, gathers descriptive information for each one and sends this to controller 100. The descriptive information for a sub-unit may contain:
manufacturer;
model number;
version;
a link to an RDF (optional); and
other information that may be required for specific embodiments.

Steps 2300 to 2318 show how the user is now able to use the graphical user interface generated at step 2240 to control the associated device. Furthermore, steps 2400 to 2406 show how devices that are able to generate unsolicited event notifications to controller 100 can be handled by redirecting them to the associated handler resource specified in the RDF or if none was specified then simply displaying the notification to the user via the GUI.

Disassociation is the process whereby the association previously formed between device 300 and controller 100 is forgotten. Thus any restrictions or access controls that came into effect during the association are removed. This is important for certain classes of device such as AV equipment that could possibly be sold to a new owner.

At step 2500 controller 100 sends a request to device 300 to disassociate. At step 2502 the device may choose to refuse the request for example if an associated controller sent the request but that controller was not privileged for this operation. If the request is refused the user is notified by steps 2512 and 2514 and the association remains intact. If the disassociation request is accepted, steps 2504 to 2510 show how both device 300 and controller 100 remove the association each has with the other and in addition controller 100 removes the device's icon from the graphical user interface along with the RDF and any resources associated with it. Once the association is removed device 300 and controller 100 are no longer able to communicate with each other.

FIG. 21 discloses one embodiment of the Resource Description File that is based on XML.

The descriptive information that device 300 provides to controller 100 during the enumeration phase is contained in <description>tag 1000.

The information that defines the functions provided by device 300 is contained in <controllable>tag 1010. For example <function>tag 1011 represents the command required to toggle the power to device 300. When the user interface is generated tag 1011 will be rendered using a default widget allocated for <function>tags (which might be a push button) unless this is overridden using a style sheet. When this widget is activated by the user, controller 100 will send the code '807F' to device 300. If voice activated commands are supported then the words contained in the <voice>tag will activate this command. As another example <function>tag 1012 represents the command required to set the volume to a nominated level. In this case tag 1012 contains a <range>tag that indicates that this widget can generate a range of values from 0 to 100 in steps of 2. Thus when the user interface is generated tag 1012 will be rendered using a widget that can show a range such as a slider or using some other widget as may be specified in a style sheet. Other such widget input specifiers are also possible for example another useful one would be a list or enumeration where a fixed set of values can be chosen and etc.

Device functions may be grouped together using the <group>tag 1013. For example it is advantageous to be able to keep certain functions together because they are logically related such as the numeric keys 0-9 or the menu navigation keys. Furthermore most current generation remote controls have 20 to 30 buttons and if these were all presented on the same screen of controller 100 the resulting interface would be difficult if not impossible to use. However most users only use a small number of functions regularly such as power, mute, volume+/−, channel+/−, back etc so then it is advantageous to be able to group commonly used functions on the first screen and have the other less used functions allocated to second and third and perhaps other screens as desired by the user. Those skilled in the art will also realise that the positioning of controls and groups of controls can also be specified via a style sheet.

As disclosed earlier, some devices may benefit by providing one or more handler resources to support and or enhance their operation. In addition some applications may require an element of automated control where actions can be taken by controller 100 without user input. The resources and interfaces required to support these capabilities are defined in <automation>tag 1020. Resources may include software applications, embedded scripts, interfaces, objects, data and any other item that may be required. For example <resource>tag 1021 defines a handler that is implemented using an embedded scripting language, whilst <resource>tag 1023 specifies a separately loaded plug-in application. If software is to be developed to control device 300, then the interface or API of the device must be known. Device manufacturers may define the API of their device using one or more <interface>tags. For example <interface>tag 1024 defines an interface named 'xert' that contains one event (that may be sent to the controller) whereas <interface>tag 1025 defines a second interface named 'epg' that contains a document, event and two methods. Handler resources are developed to implement one or more interfaces. The <implements>tag specifies which interfaces a handler resource implements. For example <implements>tag 1022 specifies that its associated handler resource implements the 'xert' interface.

As disclosed earlier it may be advantageous for controller 100 to know what the input/output capabilities of device 300 are. The <configuration>tag 1030 is provided for this purpose. From the information described in <configuration>tag 1030, controller 100 is in a position to know about the technology that implements an input or output, for example HDMI or analog composite video, the connectors used including their naming and colour coding and any special features such as supported digital protocols and the like. The ability to create a PAN, add and remove devices to and from the PAN through the proximity mechanism.

The invention claimed is:

1. An arrangement for managing wireless communication between one or more controller devices or one or more controllable devices, the arrangement comprising;
   a controllable device, the controllable device comprising a first processor, a first memory, a first proximity sensor for detecting the proximity of a controller device or another controllable device, and
   one or more communication mechanisms one of which is a proximity communication mechanism including at least a near field communication mechanism,
   wherein the controllable device has access to one or more resource description files one of those resource description files including data representative of at least a portion of the resources to control the controllable device; and
   a controller device, the controller device having a second processor, a second memory, a second proximity sensor for detecting the proximity of a controllable device or another controller device, and one or more communication mechanisms one of which is a proximity communications mechanism including at least a near field communications mechanism, wherein the controller device has no access to the one or more resource description files for the controllable device,
   wherein the devices are brought together such that at least one of the proximity sensors confirms proximity of another device after which the devices can communicate wirelessly using the near field communications mechanism to exchange data to facilitate the communication of one or more resource description files of the controllable device, containing extended mark-up language including at least a controllable tag, to the second memory of the controller device using one or more of the communication mechanisms for processing the resource description file by the processor of the controller device to allow control of the controllable device by the controller device.

* * * * *